US011898577B2

(12) United States Patent
Arulkumar et al.

(10) Patent No.: US 11,898,577 B2
(45) Date of Patent: Feb. 13, 2024

(54) SENSING DEVICE, SYSTEM AND METHOD FOR A PUMP

(71) Applicant: Weir Minerals Australia Ltd, Artarmon (AU)

(72) Inventors: Jonathan Alvin Arulkumar, Granville (AU); Chi Huy Duong, Beverly Hills (AU); Garry Bruce Glaves, Eastwood (AU)

(73) Assignee: Weir Minerals Australia Ltd.

( * ) Notice: Subject to any disclaimer, the term of this patent is extended or adjusted under 35 U.S.C. 154(b) by 19 days.

(21) Appl. No.: 17/761,394

(22) PCT Filed: Sep. 18, 2020

(86) PCT No.: PCT/AU2020/050988
§ 371 (c)(1),
(2) Date: Mar. 17, 2022

(87) PCT Pub. No.: WO2021/051165
PCT Pub. Date: Mar. 25, 2021

(65) Prior Publication Data
US 2022/0364565 A1 Nov. 17, 2022

(30) Foreign Application Priority Data

Sep. 18, 2019 (AU) ................................ 2019903474

(51) Int. Cl.
| | | |
|---|---|---|
| *F04D 7/04* | (2006.01) | |
| *F04D 15/02* | (2006.01) | |
| *F04D 17/16* | (2006.01) | |
| *F04D 29/42* | (2006.01) | |
| *F04D 29/66* | (2006.01) | |
| *G01N 29/07* | (2006.01) | |
| *G01N 29/22* | (2006.01) | |
| *F04D 1/00* | (2006.01) | |
| *F04D 17/08* | (2006.01) | |
| *F04D 15/00* | (2006.01) | |
| *F04D 9/04* | (2006.01) | |
| *F04D 1/02* | (2006.01) | |
| *F04D 27/00* | (2006.01) | |

(52) U.S. Cl.
CPC ............. *F04D 7/04* (2013.01); *F04D 15/02* (2013.01); *F04D 17/16* (2013.01); *F04D 29/4286* (2013.01); *F04D 29/669* (2013.01); *G01N 29/07* (2013.01); *G01N 29/223* (2013.01); *F04D 1/003* (2013.01); *F04D 1/025* (2013.01); *F04D 9/045* (2013.01); *F04D 9/047* (2013.01); *F04D 15/0088* (2013.01); *F04D 15/0094* (2013.01); *F04D 15/0272* (2013.01); *F04D 15/0281* (2013.01); *F04D 17/08* (2013.01); *F04D 27/001* (2013.01); *F04D 29/42* (2013.01); *G01N 2291/02854* (2013.01)

(58) Field of Classification Search
CPC . F04D 1/00; F04D 1/003; F04D 1/025; F04D 1/04; F04D 7/02; F04D 7/04; F04D 9/044; F04D 9/045; F04D 9/046; F04D 9/047; F04D 9/048; F04D 13/14; F04D 15/0088; F04D 15/0094; F04D 15/02; F04D 15/0209; F04D 15/0236; F04D 15/0245; F04D 15/0254; F04D 15/0272; F04D 15/0281; F04D 17/06; F04D 17/08; F04D 17/10; F04D 17/12; F04D 17/122; F04D 17/125; F04D 17/14; F04D 17/16; F04D 25/0666; F04D 27/001; F04D 29/14; F04D 29/167; F04D 29/40; F04D 29/42; F04D 29/4286; F04D 29/622; F04D 29/669; G01N 29/07; G01N 29/223; G01N 2291/02854; F05D 2260/77; F05D 2270/00
See application file for complete search history.

(56) References Cited

U.S. PATENT DOCUMENTS

| | | | |
|---|---|---|---|
| 4,242,744 A | 12/1980 | Rottmar | |
| 4,535,326 A * | 8/1985 | Mullins | F04B 53/00 417/63 |
| 7,794,215 B2 * | 9/2010 | Oglesby | F04B 53/02 92/87 |
| 9,243,631 B2 * | 1/2016 | Patton | F04C 14/28 |
| 10,895,265 B2 * | 1/2021 | Kosmicki | F04D 29/4293 |
| 2007/0163325 A1 | 7/2007 | Radzisewski et al. | |
| 2009/0180866 A1 * | 7/2009 | Bourgeois | F04D 29/622 415/170.1 |
| 2011/0118998 A1 * | 5/2011 | Loose | G01H 1/00 702/54 |
| 2013/0068027 A1 | 3/2013 | Sullivan et al. | |

(Continued)

FOREIGN PATENT DOCUMENTS

| | | |
|---|---|---|
| CN | 108592776 A | 9/2018 |
| CN | 106151053 B | 1/2019 |
| EP | 0774583 A1 | 5/1997 |

(Continued)

*Primary Examiner* — Binh Q Tran

(74) *Attorney, Agent, or Firm* — Morriss O'Bryant; Compagni Cannon PLLC.

(57) ABSTRACT

A sensing device for a centrifugal slurry pump having an impeller which rotates about an axis, the centrifugal slurry pump including a side liner and a main liner housed within an outer casing of the pump, the sensing device comprising; a body portion arranged to pass through the outer casing, wherein the body portion includes a sensor biased towards contact with either the side liner or the main liner of the pump.

30 Claims, 18 Drawing Sheets

(56) References Cited

U.S. PATENT DOCUMENTS

2019/0203736 A1* 7/2019 Hambe ............... F04D 29/4293
2019/0391050 A1* 12/2019 Koopmann ......... G01M 99/005

FOREIGN PATENT DOCUMENTS

| GB | 2523116 A | 8/2015 | | |
|----|-----------|--------|---|---|
| JP | S58110893 A | 7/1983 | | |
| JP | H0544688 A | 2/1993 | | |
| WO | 2013059458 A1 | 4/2013 | | |
| WO | 2018122016 A1 | 7/2018 | | |
| WO | WO-2018183543 A1 * | 10/2018 | ............. | C07C 5/321 |

* cited by examiner

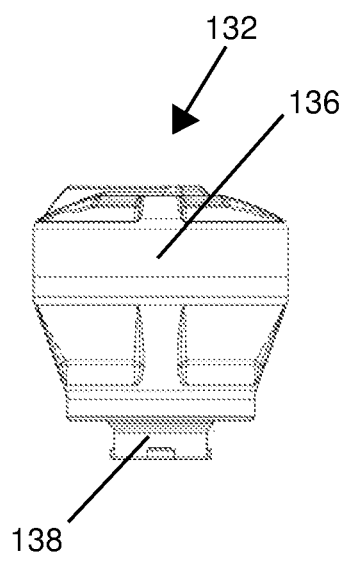 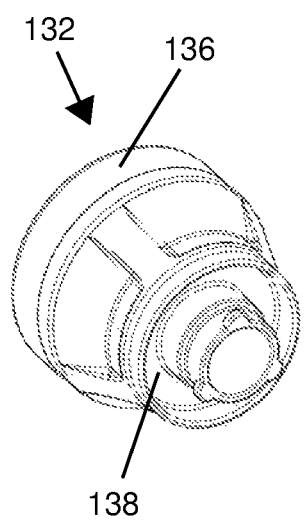 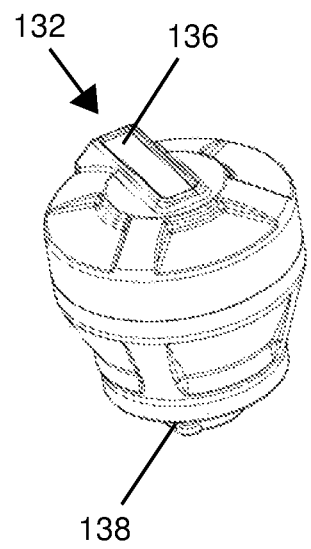
Fig. 8        Fig. 8.1        Fig. 8.2

SENSING DEVICE, SYSTEM AND METHOD FOR A PUMP

TECHNICAL FIELD

The present invention generally relates to a device, system and method for a pump, and more particularly to a device, system and method suitable for detecting wear in a pump.

BACKGROUND

A slurry pump is a type of pump designed for pumping slurry, slurry being a liquid containing solid particles. Variations in design and construction may be occur to account for various type of slurry, which may vary in the concentration of solid particles, the size of solid particles, the shape of solid particles, and composition of the solution. An example of a slurry pump is a centrifugal pump.

Due to the abrasive nature of the medium being pumped, slurry pumps experience a very high wear rate on their internal components, such as the main liner that houses the impeller and the side liners located on either side of the main liner. A side liner may include a front sider liner that is located on the inlet side of the impeller. Alternatively, a side liner may include the rear side liner that is located on the opposing side of the impeller. In particular, the front side liner (which is also referred to a throatbush) and the main liner (which is also referred to as a volute) are subjected to significant amounts of wear.

The performance and wear life of a centrifugal pump directly relates to the gap that located between the rotating impeller and the front side liner. This gap is particularly important for slurry pumps as a larger gap results in higher recirculating flow being generated in the high pressure region in the pump casing. This recirculating flow reduces the pump efficiency and also increases the wear rate on the pump impeller and the front side liner. With time, as the gap becomes wider, there is a greater decrease in the pumps performance and an increased wear rate. Some conventional side liners can be adjusted axially to reduce the gap. However, such adjustment does not alleviate localised wear and any pockets of localised wear will become larger over time.

Further, it is important for an operator to have knowledge of the thickness of the front side liner, back side liner and main side liner for the practice of effective maintenance. Such information would inform the operators of slurry pumps of the optimal time to replace the liners, as replacing them too early is financially undesirable and replacing them too late runs the risk of failure of the liner and damage to the impeller, casing and other components. However, accurately determining the thickness of the various liners is challenging due to their location within the thick outer casing of the pump. As such, it is common for pumps to be disassembled and visually inspected for wear, which is a time consuming and costly exercise.

In the past, ultrasonic sensors have been mounted to the outside of the outer pump casing, using magnets or other such devices to adhere the ultrasonic sensing device to the pump. Such devices may be placed around various locations on the exterior of the pump and wired together in order to communicate with one another. However, such solutions require the determination of the thickness of the internal components through different surfaces, such as the thick outer casing. The outer casing is designed to contain the high pressures generated during operation of the pump, but the thickness of the casing decreases the accuracy of external readings. Further, additional issues are encountered when measuring the thickness of a front side liner that is axially adjustable relative to the main liner.

The preferred embodiments of the present invention seek to address one or more of these disadvantages, and/or to at least provide the public with a useful alternative.

The reference in this specification to any prior publication (or information derived from the prior publication), or to any matter which is known, is not, and should not be taken as an acknowledgment or admission or any form of suggestion that the prior publication (or information derived from the prior publication) or known matter forms liner of the common general knowledge in the field of endeavour to which this specification relates.

SUMMARY

This Summary is provided to introduce a selection of concepts in a simplified form that are further described below in the Detailed Description. This Summary is not intended to identify essential features of the claimed subject matter, nor is it intended to be used to limit the scope of the claimed subject matter.

In a first aspect, there is provided by way of example only, a sensing device for a centrifugal slurry pump having an impeller which rotates about an axis, the centrifugal slurry pump including a side liner and a main liner housed within an outer casing of the pump, the sensing device comprising; a body portion arranged to pass through the outer casing, wherein the body portion includes a sensor biased towards contact with either the side liner or the main liner of the pump.

In a further example embodiment, the side liner is a front side liner, the front side liner comprising a front face and a rear face, the front face is arranged to face the impeller housed within the main liner, and the rear face is arranged to face the outer casing, wherein where the front side liner is arranged to be axially adjustable with respect to the main liner and the sensor is arranged to remain biased towards and in contact with the front side liner when the front side liner is axially adjusted with respect to the main liner of the pump.

According to yet further optional aspects, provided by way of example only, the sensor senses a distance between the front face and the rear face to provide at least one thickness reading for the side liner or the main liner In a further embodiment, the at least one thickness reading includes a first thickness reading and a second thickness reading, where the first thickness reading and the second thickness reading are separated by a period of use of the pump.

In still a further particular, but non-limiting form, the body portion includes a head portion, said head portion including a communication module in connection with the sensor.

In a further, non-limiting embodiment, the head portion is arranged to locate outside, the surface of the outer casing.

In a further example embodiment, the communication module transmits each of the first thickness reading and the second thickness reading from the sensor to a computing device.

In yet another example, the computing device compares the first thickness reading and the second thickness reading to determine a change in thickness of the main liner or the side liner for the period of use.

According to yet further optional aspects, a user of the computing device axially adjusts a position of the front side liner relative to the main liner in accordance with the change in thickness of the front side liner such that such that the distance between the front side liner and an impeller housed in the main liner remains constant.

In a further embodiment, the body portion includes an elongate tube member, wherein the elongate tube member is slidingly received within the head portion.

In a further, non-limiting embodiment, a first end of the elongate tube member includes a bias mechanism that biases the elongate tube member towards the main liner or side liner of the pump.

In yet another non-limiting example, the bias mechanism is a spring.

According to yet further optional aspects, a second end of the elongate tube member portion includes the sensor.

In an embodiment, the body portion includes a connection portion that is arranged to be connected to the outer casing.

In yet another example embodiment, the body portion is removably connected to the connection portion such that the sensing device passes through the outer casing of the pump.

According to yet further optional aspects, the body portion is cylindrically shaped.

In another embodiment, the head portion further comprises at least one power source.

In another embodiment, the at least one power source is connected to the communication module and powers the operation of the sensor.

In yet another example embodiment, the sensing device includes a wired connection that joins the communication module to the ultrasonic device.

According to yet further optional aspects, the wired connection arranged to enable the relative movement of the elongate tube member relative to the head portion.

In another embodiment, the wired connection is an expandable and contractible coil of insulated wire.

In yet another non-limiting embodiment, the at least one power source is a Lithium battery.

In a further embodiment, the sensor is an ultrasonic sensor.

In another embodiment, the ultrasonic sensor is an ultrasonic transducer.

According to yet further optional aspects, the ultrasonic transducer is a piezoelectric transducer.

In yet another embodiment, the side liner is a rear side liner, wherein the sensor is arranged to remain in contact with the rear side liner of the pump.

In a second aspect, there is provided a system for detecting wear in a centrifugal slurry pump with a side liner and a main liner housed within an outer casing, said system comprising a sensing device arranged to pass through the outer casing, wherein the sensing device includes a sensor biased towards and in contact with either the side liner or the main liner of the pump.

According to yet further optional aspects, the sensor detects a first thickness reading and a second thickness reading of either the side liner or the main liner.

In yet another embodiment, the system further includes a computing device in communication with the sensing device, the computing device being arranged to receive the first thickness reading and the second thickness reading from the sensing device.

In yet another example embodiment, the computing device uses the first thickness reading and the second thickness reading to determine a change in thickness of the side liner or the main liner.

In yet another non-limiting example, the side liner is a front side liner arranged to be axially adjustable with respect to the main liner, wherein a user axially adjusts the front side liner relative to the main liner in accordance with the change in thickness of the front side liner.

In a third aspect, there is provided a method of detecting wear in in a centrifugal slurry pump with a side liner and a main liner housed within an outer casing, the method comprising the steps of: arranging a sensing device to pass through a surface of the outer casing, the sensing device including a sensor; arranging the sensing device relative to the pump such that the sensor is biased towards and in contact with the side liner or the main liner; communicating a first thickness reading and a second thickness reading of either the side liner or the main liner from the sensing device to a computing device, and determining a change in thickness of the side liner due to wear using the computing device.

According to yet another example form, there is provided a device for a centrifugal slurry pump with a side liner and a main liner, the side liner being arranged to be axially adjustable with respect to the main liner, the device comprising; an ultrasonic sensor adapted to bias towards contact with a side liner of the pump, such that the ultrasonic sensor maintains contact with the side liner to determine at least one thickness reading for the side liner.

In a fourth aspect, there is provided a sensing device for an unlined centrifugal slurry pump having an impeller which rotates about an axis, the centrifugal slurry pump including an outer casing of the pump, the outer casing including an inner surface and an outer surface, the sensing device comprising; a body portion arranged to engage with a bracket connected to the outer surface, wherein the body portion includes a sensor biased towards contact with the outer surface of the pump.

In an embodiment, the sensor senses a distance between the outer surface and the inner surface to provide at least one thickness reading for the outer casing of the unlined centrifugal slurry pump.

In another embodiment, the sensing device is connected to the outer casing of the unlined centrifugal slurry pump via a bracket, the bracket arranged to be connected to at least one non-wearing face provided to the outer casing.

BRIEF DESCRIPTION OF FIGURES

Example embodiments are apparent from the following description, which is given by way of example only, of at least one non-limiting embodiment, described in connection with the accompanying figures.

FIGS. 8, 8.1 and 8.2 respectively illustrate a side view, bottom perspective view and top perspective view of a sensing device in accordance with an embodiment of the present invention.

DETAILED DESCRIPTION

Figure 1:
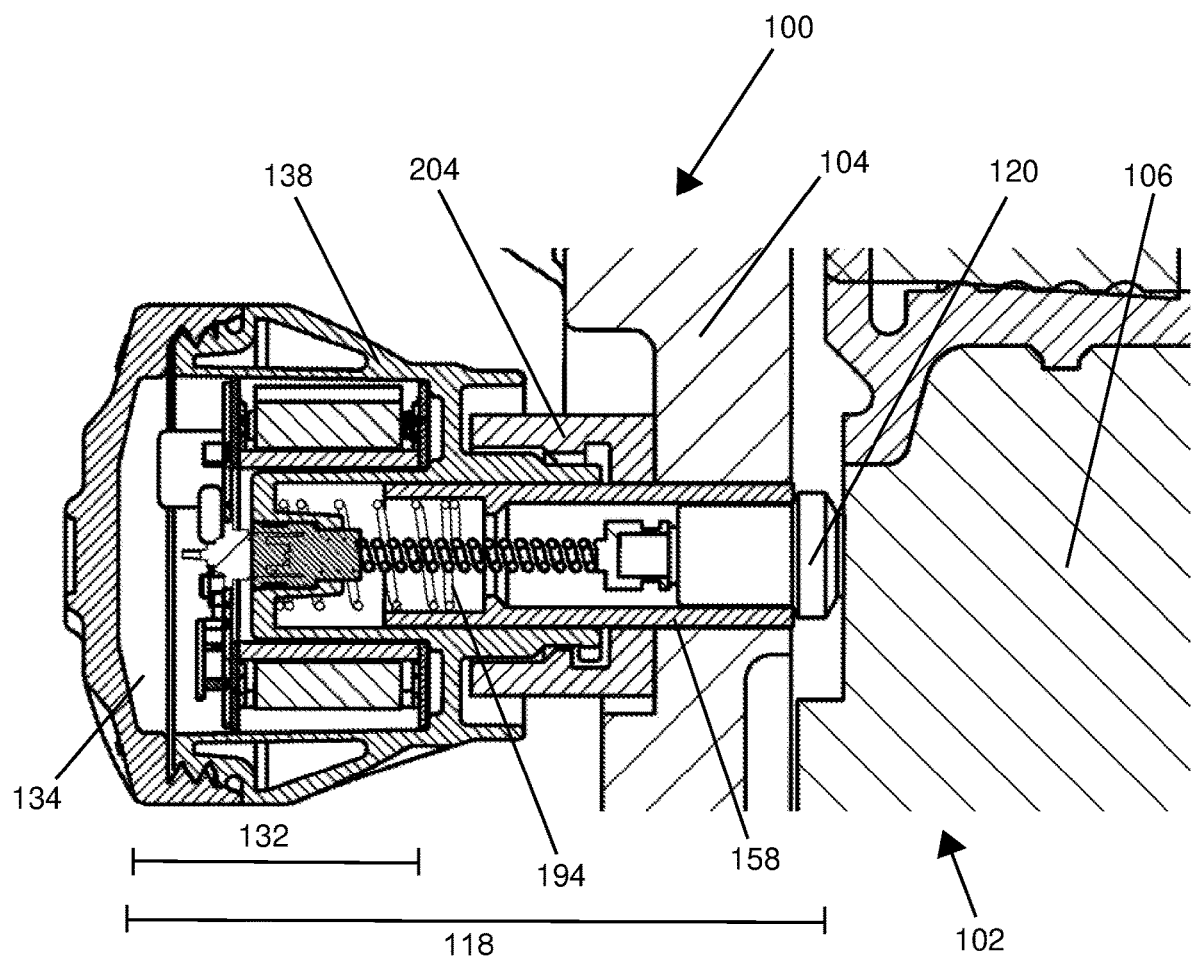
FIG. 1 illustrates a cross section view of a sensing device in accordance with an embodiment of the present invention.
Figure 2:
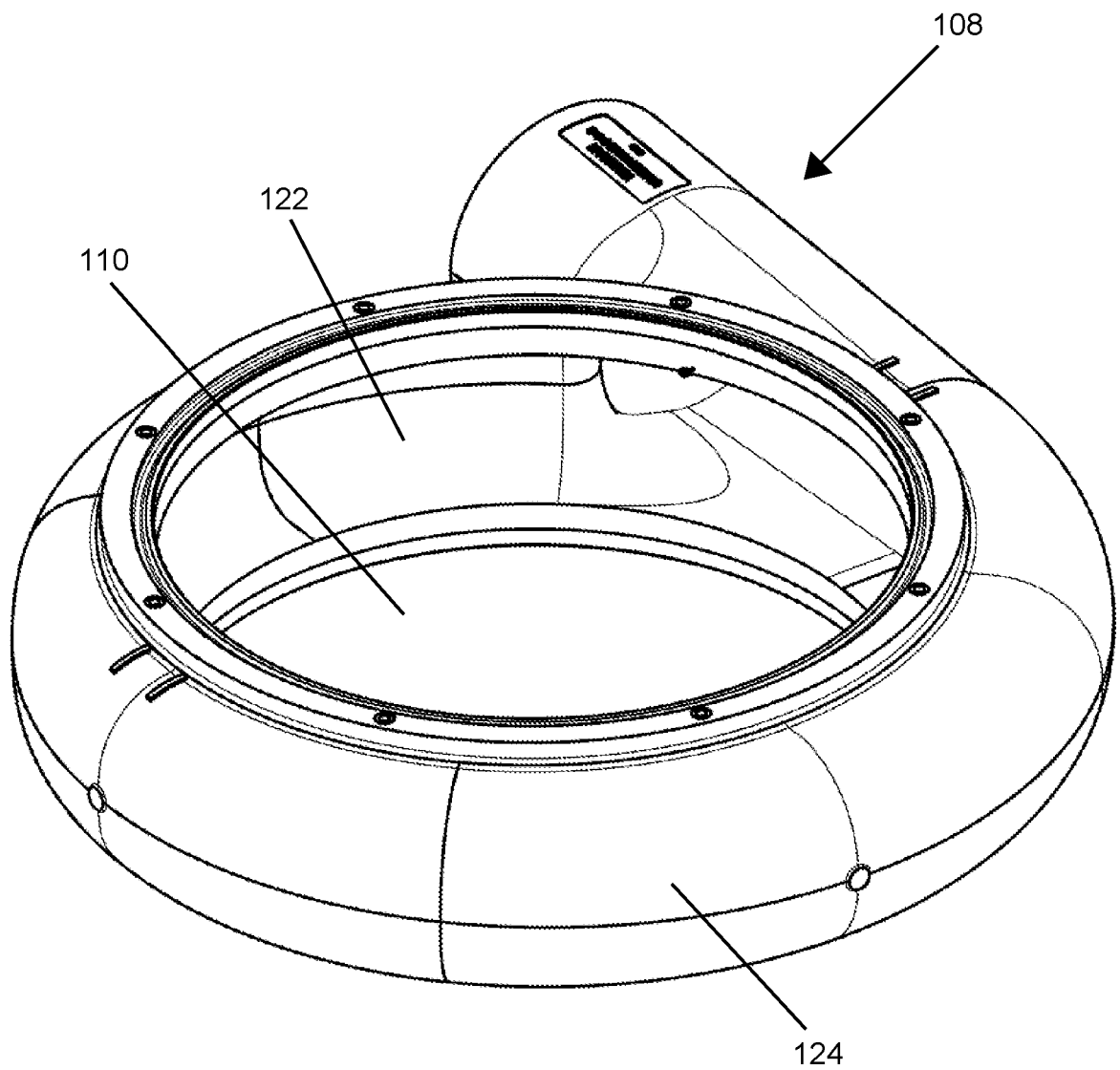
FIG. 2 illustrates a bottom perspective view of an example main liner in accordance with an embodiment of the present invention.
Figure 3:
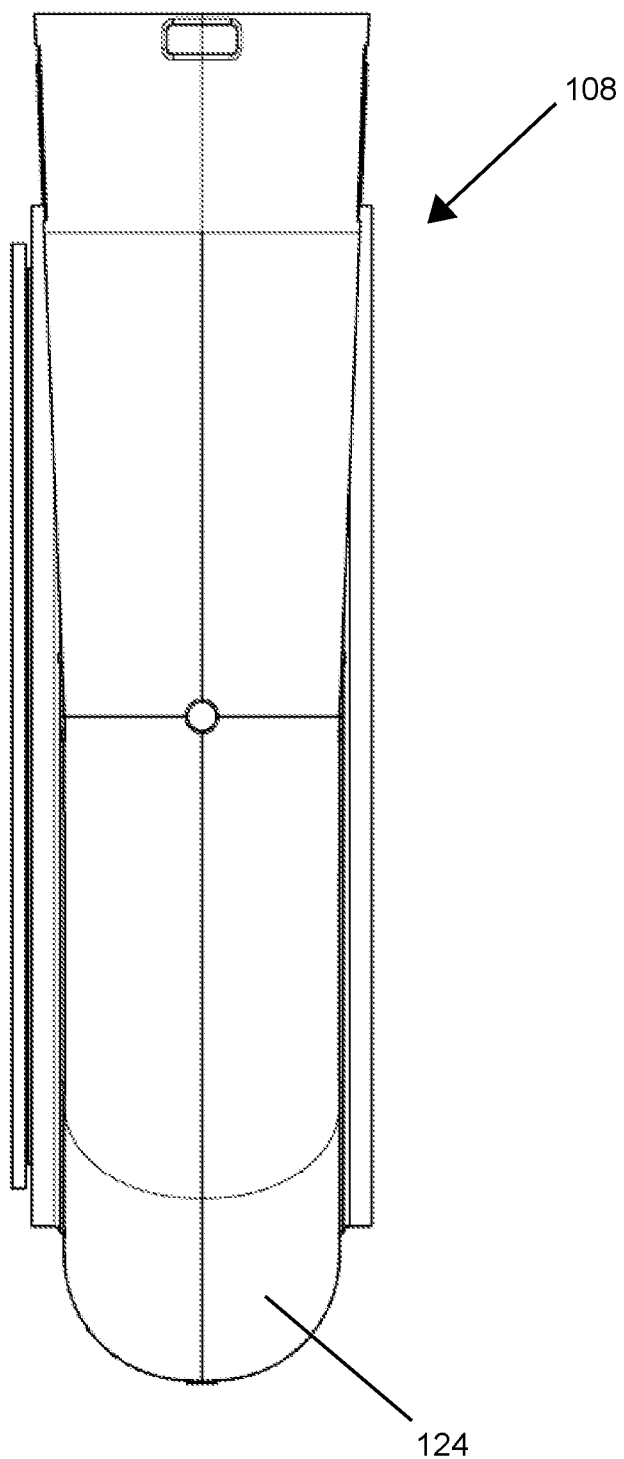
FIG. 3 illustrates a side view of an example main liner in accordance with an embodiment of the present invention.
Figure 4:
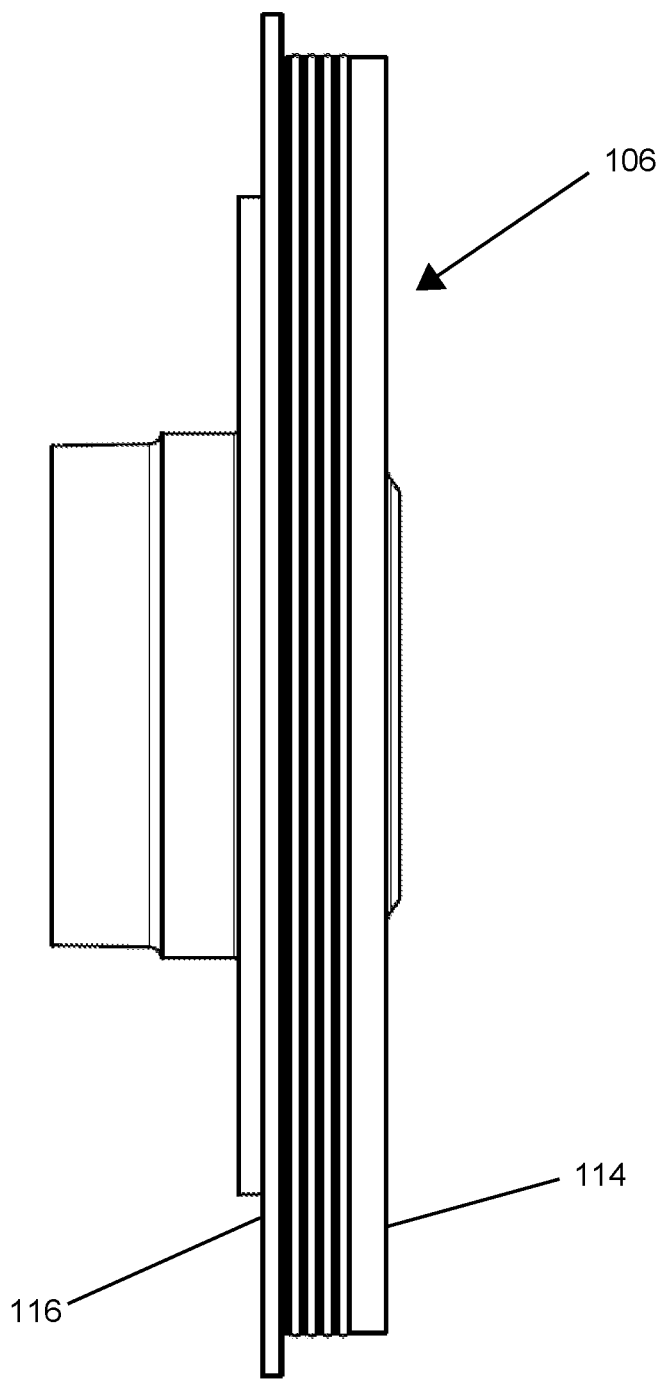
FIG. 4 illustrates a side view of an example front side liner in accordance with an embodiment of the present invention.
Figure 5:
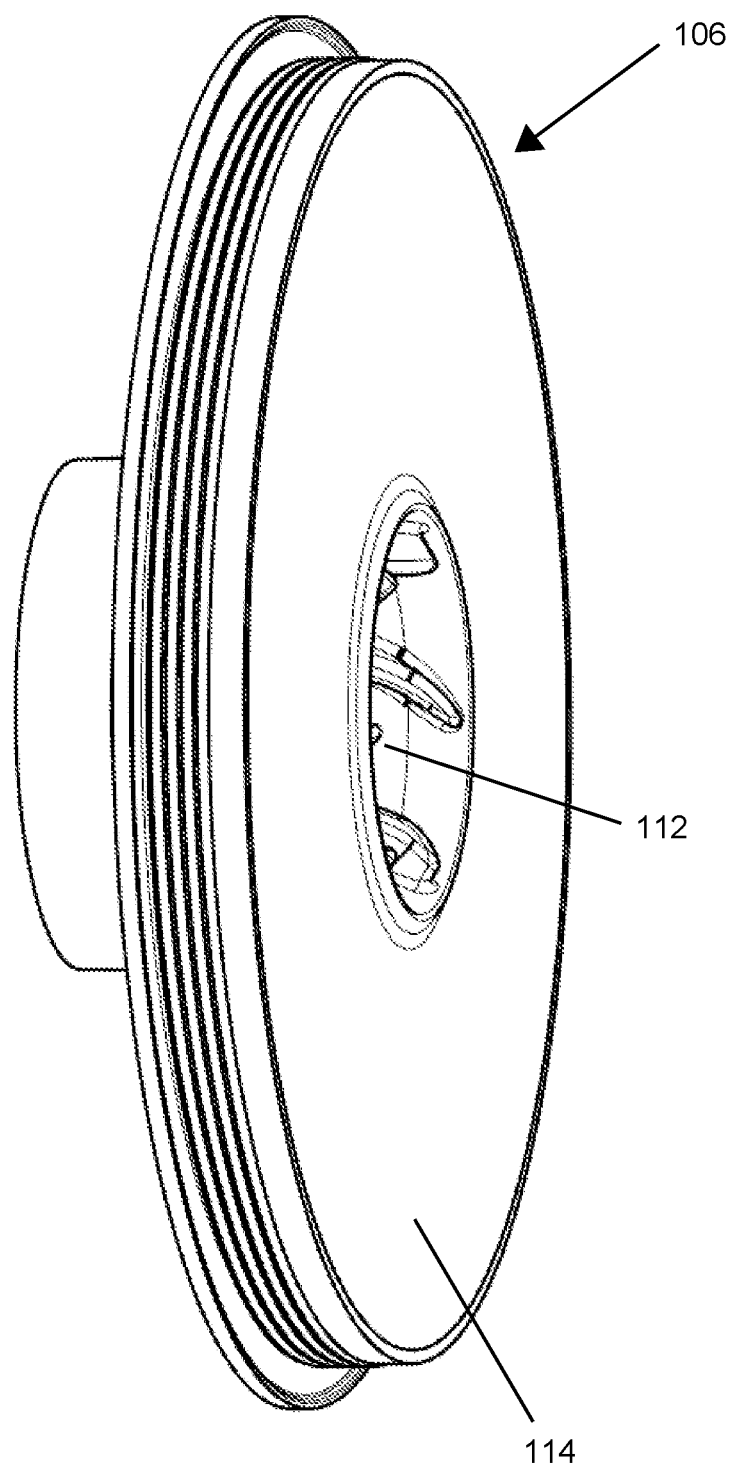
FIG. 5 illustrates a perspective view of an example front side liner in accordance with an embodiment of the present invention.

The following modes, given by way of example only, are described in order to provide a more precise understanding of one or more embodiments. In the figures, like reference numerals are used to identify like liners throughout the figures.

With general reference to FIGS. 1 to 5, the invention is described in relation to a centrifugal slurry pump referred hereafter as "the pump". The pump may be lined or unlined. That is, a lined pump includes internal wearing liners and an unlined pump does not. These wearing liners are described in further detail below.

A general description of a lined pump 102 is provided as follows. The pump 102 may include an outer casing 104, which provides an outer housing for the internal components of the pump 102. The outer casing 104 may be formed from cast or ductile iron. The pump 102 may be supported by a pedestal or base that is attached to the outer casing 104. The outer casing 104 may be formed from two side casing parts or halves (sometimes also known as the frame plate and the cover plate) which are joined together about the periphery of the two side casings parts.

The pump 102 is formed with an inlet hole and a discharge outlet hole. When in use, for example in a process plant, the pump 102 is connected by piping to the inlet hole and to the outlet hole, for example to facilitate pumping of a mineral slurry.

The pump 102 may include a side liner and a main liner housed within the outer casing 104 of the pump 102. More particularly, the outer casing 104 houses a main liner (or volute) and two side liners. An example of a main liner 108 is provided in FIGS. 2 and 3. The main liner 108 further defines a pump chamber 110 in which an impeller (not shown) is positioned for rotation. The impeller is attached to a drive shaft rotated by a motor, where the drive shaft drives the impeller to rotate about an axis within the pump chamber 110.

The outer casing 104 also houses the two side liners, the first being the rear side liner (also known as the back liner) is located nearer the rear end of the pump 102 (that is, nearest to the pedestal or base). The other side liner is a front side liner 106 (also known as a front liner or throatbush) and is located nearer the front end of the pump 102 proximate to the inlet hole or suction side of the pump 102. Accordingly, the front side liner 106 on the suction side of the pump 102 is provided with an aperture 112 to accommodate the inlet hole. An example of a front side liner 106 is provided in FIGS. 4 and 5. The front side liner 106 may further comprise a front face 114 and a rear face 116, the front face 114 is arranged to face the impeller housed within the main liner 108, and the rear face 116 is arranged to face the outer casing 104.

Figure 6:
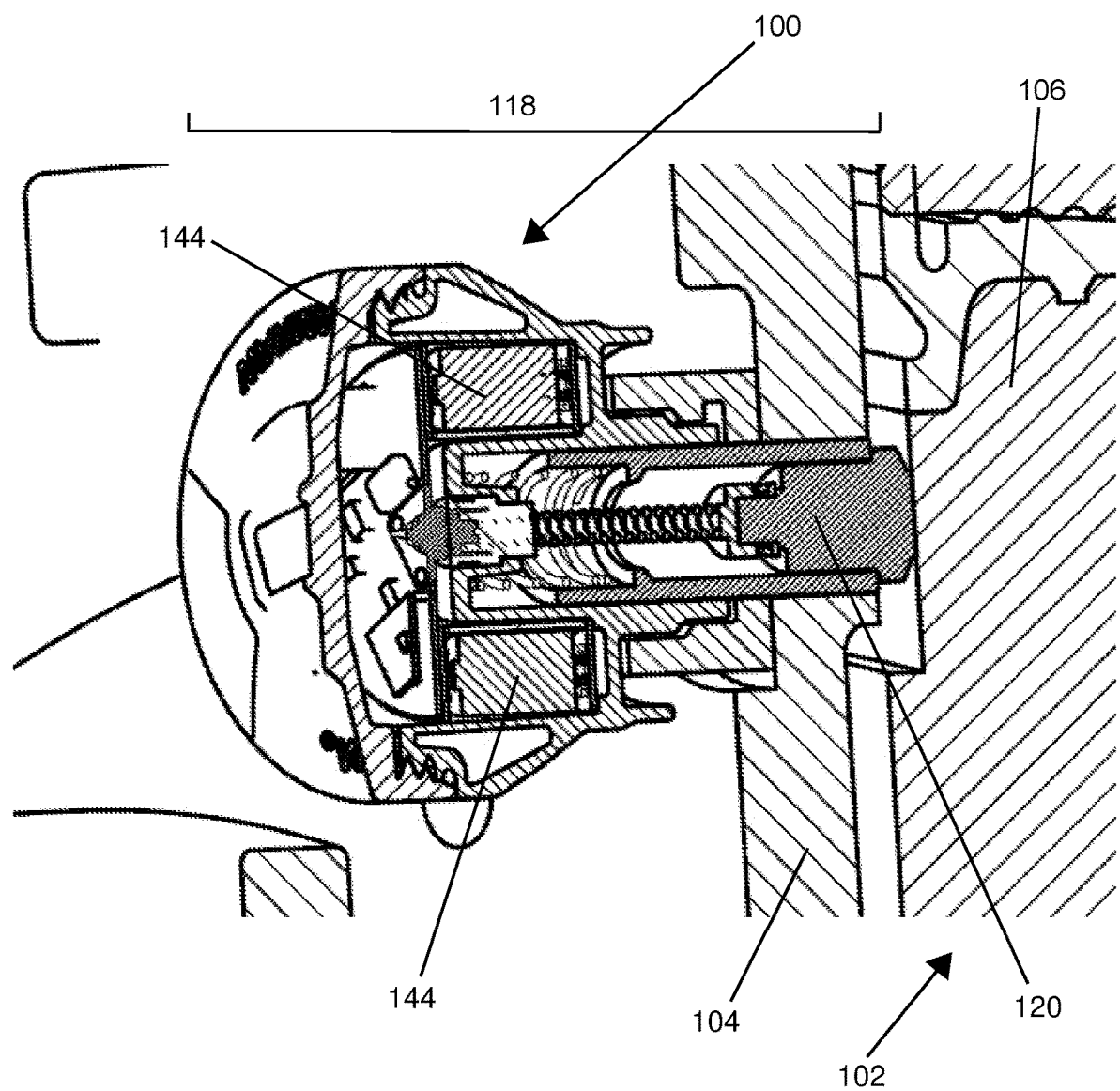
FIG. 6 illustrates a perspective a cross section view of a sensing device in accordance with an embodiment of the present invention.

Referring to FIG. 6, an embodiment is provided of a sensing device 100. The sensing device 100 may be provided to the pump 102. The sensing device 100 may comprise a body portion 118 that is arranged to pass through the outer casing 106. In an embodiment, the body portion 118 includes a sensor 120, which may be arranged to be in contact with either the side liner 106 or the main liner 108 of the pump 102. In a further embodiment, the sensor 120 may be arranged to be biased towards and in contact with either the side liner 106 or the main liner 108 of the pump 102.

Referring again to FIG. 1, an embodiment is provided where the front side liner 106 may be arranged to be axially adjustable with respect to the main liner 108. In the context of the specification, the terms "axially adjustable" and "axially adjusted" are taken to mean that the front side liner 106 may be translated or moved along the axis of rotation of the impeller. As such, the front side liner 106 may be adjusted in order to maintain a constant distance between the front face 114 and the impeller housed within the main casing 108. In such an embodiment, the sensor 120 is arranged to be biased towards and remain in contact with the front side liner 106 when the front side liner 106 is axially adjusted with respect to the main liner 108 of the pump 102.

In an embodiment, the sensor 120 is an ultrasonic sensor that senses a distance between the front face 114 and the rear face 116 to provide at least one thickness reading for the front side liner 106. In another embodiment, the sensor 120 is an ultrasonic sensor that senses a distance between the inner surface 122 of the main liner 108 (that is, the surface of the pumping chamber that faces the impeller) and the outer surface 124 of the main liner (that is, the surface facing or in contact with the outer casing 104) to provide at least one thickness reading for the main liner 108.

Alternatively, the sensor 120 may be an ultrasonic sensor for sensing the thickness of a side liner, where the side liner is a rear side liner arranged to locate between the impeller and the motor. That is, the rear side liner is on the opposite side of the impeller to the front side liner. In all such embodiments, the sensor 120 is arranged to be in contact with and biased towards the liners. In the following description, the term "liners" refers interchangeably to any one of the front side liner, main liner or the rear side liner of the pump 102. In an embodiment, the liners may be made of a wear resistant material such as but not limited to a high-chromium alloy material. Alternatively, the liners may be made from a wear resistant elastomeric material.

The sensor 120 may be an ultrasonic sensor, such as ultrasonic transducer, which may include piezoelectric transducers or capacitive transducers. For example, the transducer may be a single element, longitudinal wave transducer for use in direct contact. Alternatively, the transducer may be a dual element transducer that includes two crystal elements housed in a single case, the crystals being separated by an acoustic barrier. One element transmits longitudinal waves, and the other element acts as a receiver.

In alternative embodiments, other types of ultrasonic sensors may be used, such as a replaceable delay line transducer, which is a single element that is heavily damped for use with a replaceable delay line, or an immersion transducer, which is single element, longitudinal wave transducer with a quarter-wavelength layer acoustically matched to water. As such, it is within the purview of the skilled addressee that other types of ultrasonic transducers may be used to carry out the workings of the invention as described and defined within the claims.

The sensor 120 may be arranged to generate ultrasonic pulses and transmit such pulses through a medium. The sensor 120 may also be arranged to receive echoes of such pulses, whilst measuring the time interval between when they are received. Using this time interval, the thickness of the medium can be determined. For example, the sensor 120 may be arranged to transmit an ultrasonic pulse from the rear face 116 of the front side liner 106 and receive a reflected pulse that is reflected off the interface formed by the front face 114 of the front side liner 106. Alternatively, the sensor 120 may also be arranged to transmit an ultrasonic pulse from the outer surface 124 of the main liner 108 and measuring the time interval until the sensor 120 receives the reflected pulse that is reflected off the interface formed by the inner surface 122 of the main liner 108.

The sensor 120 may also measure the time interval between the pulse being transmitted and the reflected pulse being received. For example, this may be done by measuring the time interval between the transmission of the ultrasonic pulse through the liner and the first returning echo of that pulse. A small offset value may be subtracted from this time interval to account for fixed instrument, cable, and transducer wear plate delays. The thickness of the liner is determined using the measured time interval and a known velocity of the sound wave pulse through the liner, as the material of the liner and the velocity of an ultrasonic pulse through the medium is a known variable.

Figure 7:
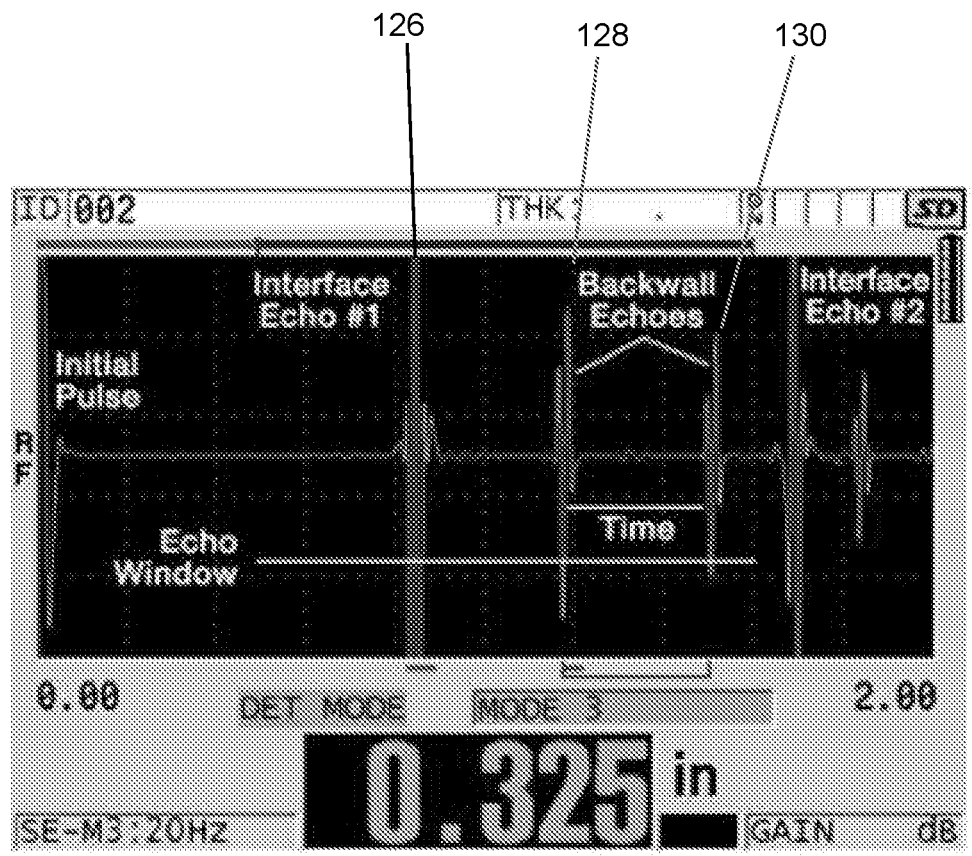
FIG. 7 illustrates an example user interface for a sensing device in accordance with an embodiment of the present invention.

Alternatively, when referring to FIG. 7, an example of a user interface is provided. The user interface merely provided to demonstrate a method by which the thickness of the liner may be determined by measuring the time interval between two successive backwall echoes. A backwall echo is a soundwave that rebounds of the distal boundary of the liner. For example, as shown in FIG. 7, for a sensor 120 in contact with a front side liner 106, the first interface echo 126 is the reflected sound signal from the ultrasound pulse reflecting off the rear face 116 of the front side liner 106. Further, a first backwall echo 128 and a successive second backwall echo 130 are the reflected sound signals from the ultrasound pulse reflecting off the front face 114 of the front side liner 106. The thickness of the liner between the rear face 116 and the front face 114 may be determined by measuring the time period between the first backwall echo 128 and second backwall echo 130. That is, the second back wall echo is part of the ultrasound pulse that has travelled through the liner twice. As would be understood by skilled addressee, this measurement may be taken multiple times for single point in time and combined to form a thickness reading. The combination of multiple measurements into a single reading may improve the accuracy of the readings. For example, a thickness reading may include an average of approximately five to ten individual measurements.

In an embodiment, the sensor 120 may be arranged to sample at least one thickness reading within the same period of use of the pump 102, where the period of use is understood to mean a discrete period of time over which the pump is in operation. The sensor 120 may be arranged to sample at least one thickness reading, where the at least one thickness reading may include a first thickness reading and a second thickness reading. The first thickness reading and the second thickness reading are separated by a period of use of the pump 102. That is, the sensor 120 may be arranged to measure the thickness of the liner at two different points in time, where the pump 102 has been in use and has been subject to wear during the period between these two points in time.

In an embodiment, the sensing device 100 may include a polymer putty that is located between the sensor 120 and the liner. The polymer putty may improve the effectiveness of the transmission of the ultrasound pulse into the liner and reduce the magnitude of the interface echo. The polymer putty may also provide a small adhesive effect that additionally increases contact with the sensor 120 and the liner.

In an embodiment, the body portion 118 includes a head portion 132, said head portion 132 including a communication module 134 in connection with the sensor 120. The communication module 134 may be arranged to transmit data collected from the sensor 120 to a computing device. The data may be representative of a time period between various ultrasound pulses and reflections as described above. The terms data refers to the information transmitted via a signal. The data may incorporate multiple readings from the sensor at a single point in time or across multiple points in time.

In an embodiment, the communication module 134 may include a communication unit arranged to facilitate the communication of data between the sensing device 100 and a computing device. The computing device describes a separate computer under the control of the user that is arranged to undertake further analysis of the data collected by the sensing device 100. The computing device may also be configured to store the data collected by the sensing device 100 and may include servers or other computers that are connected to the computing device via a network. A person skilled in the art would understand that the term computing device describes a broad range of computing devices, technology and architectures.

The communication unit may include a Bluetooth Low Energy (BLE) module and antenna for short range and long range communication with the computing device, or another wireless personal area network communication device or technology. The communication unit may be programed to include a communication cycle, where the communication module 134 remains mostly inactive in a power conservation mode and will only transmit data to the computing device at a time optimal for battery conservation, such as when a device capable of receiving the data is detected as being in range. For example, when a user with a computing device, that may include a mobile device such as a smart phone, laptop or tablet, comes in range of the communication unit.

The communication module 134 may also include a processor, such as a Central Processing Unit (CPU) for the processing of data and other such operations. Further, the communication module may include a memory module that includes both volatile and non-volatile data storage so that data from the sensor 120 may be stored on the sensing device 100 to be transmitted to the computing device at a later time. The data storage may be arranged with such a capacity to store hundreds or thousands of data sets collected by the sensor 120.

In an embodiment, the communication module 134 may be arranged to enable "remote processing" of data collected by the sensor 120. Remote processing within the context of the specification is understood to mean that the sensing device 100 is responsible for the collection and transmission of data, whilst the computing device is responsible for processing, transforming and contextualising the data to form information. That is, the communication module 134 may be arranged to filter an analogue data received from the sensor 120 to reduce or remove noise and artefacts and/or convert the analogue data gathered by the sensor 120 into digital data and transmit the digital data to the computing device. Once transmitted, the computing device may convert this data into a thickness reading. Alternatively, the sensor 120 may be arranged to filter analogue data received from the sensor 120 to reduce or remove noise and artefacts and/or convert the analogue data into digital data, where the communication module 134 then transmits the digital data to the computing device to be converted into a thickness reading.

In an alternate embodiment, the communication module 134 may be arranged to provide "on-board" processing. On-board processing within the context of the specification is understood to mean that the sensing device 100 is responsible for collecting, processing, transforming and contextualising the data to form information and transmitting the information to a computing device. For example, the CPU may be arranged to do one or more of; filter analogue data received from the sensor 120 to reduce or remove noise and artefacts, convert the analogue data received from the sensor 120 into digital data, and use the digital data to determine at least one thickness reading. For example, the communication module 134 may be arranged to determine the at least one thickness reading from data received from the sensor 120 and transmit the at least one reading to the computing device.

In an embodiment, the computing device may be arranged to perform additional analysis or processing of the data. For example, the computing device may compare the first thickness reading and the second thickness reading to determine a change in thickness of the main liner or the side liner for the period of use. In other words, the computing device may determine the change in liner thickness by subtracting the first thickness reading from the second thickness reading. By knowing the change in liner thickness, a user will be able to determine the level of wear experienced by the internal components of the pump, which would be otherwise near impossible to determine without dissembling the pump.

In an embodiment, where the front side liner 106 may be arranged to be axially adjustable with respect to the main liner 108, the sensing device 100 enables a user to axially adjust a position of the front side liner 106 relative to the main liner 108 in accordance with the change in thickness of the front side liner 106. In other words, the user changes the position of the front side liner 106 to maintain a constant distance between the front side liner 106 and an impeller housed in the main liner 108.

The user may use the change in liner thickness to optimise the performance of the pump without having to disassemble the pump. That is, as the front face 114 of the front side liner 106 wears out, the user axially adjusts the front side liner 106 by moving the front side liner 106 towards the impeller by the same distance as the change in thickness to ensure that the gap between the impeller and front side liner 106 remains in the optimal range. Otherwise, with an increased gap, the increases the recirculating flow reduces the pump efficiency and increases the wear rate on the pump impeller and the front side liner 106.

Referring now to FIG. 1 and FIGS. 8 to 11, an embodiment is provided wherein the body portion 118 includes a head portion 132, where said head portion 132 includes the communication module 134 in connection with the sensor 120.

The head portion 132 may be arranged to align with, or locate outside, the surface of the outer casing 104. Referring in particular to FIG. 1, the head portion 132 may be arranged to extend through the entirety of and protrude past the surface of the outer casing 104. Alternatively, the head portion 132 may be arranged to sit within a recess formed within the outer surface of the outer casing 104 (not shown) such that the head portion 132 sits flush with respect to the outer surface of the outer casing 104. By locating at least part of the head portion 132 outside the thick outer casing 104 or in line with outer casing 104, the sensor device 100 is able to wirelessly communicate the data collected by the sensor 120 to the computing device.

Figure 9:
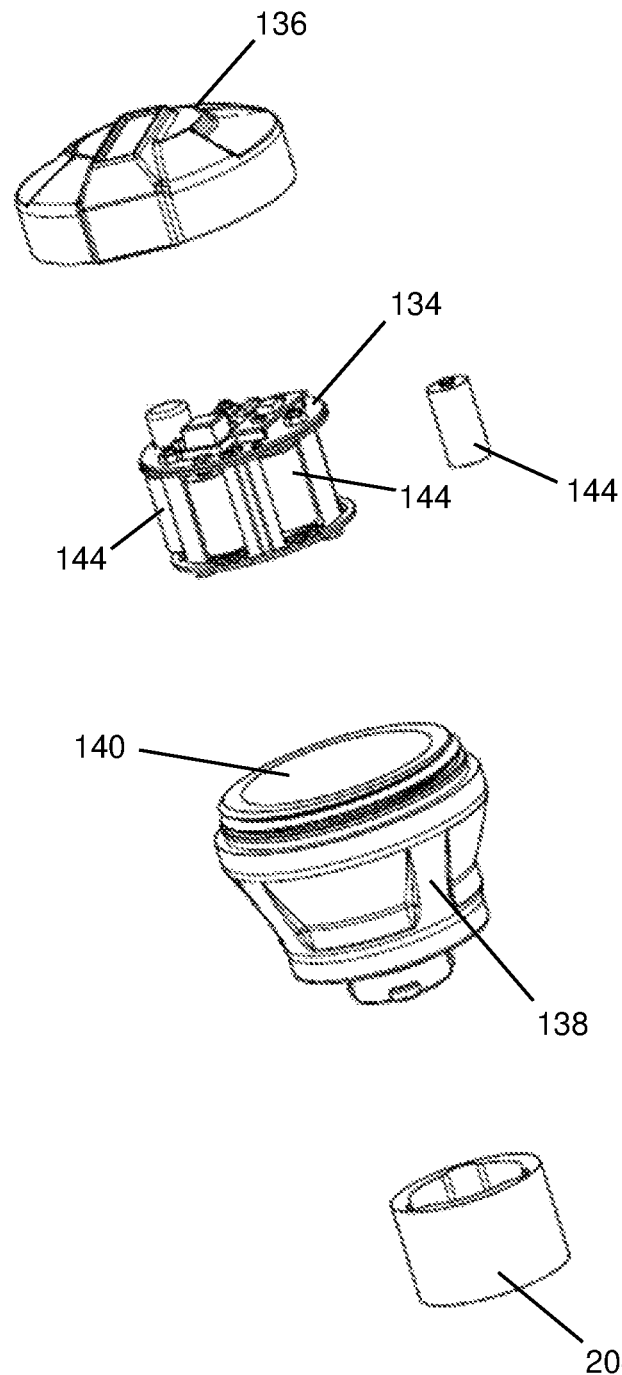
FIG. 9 illustrates a top perspective exploded view of a sensing device in accordance with an embodiment of the present invention.
Figure 10:
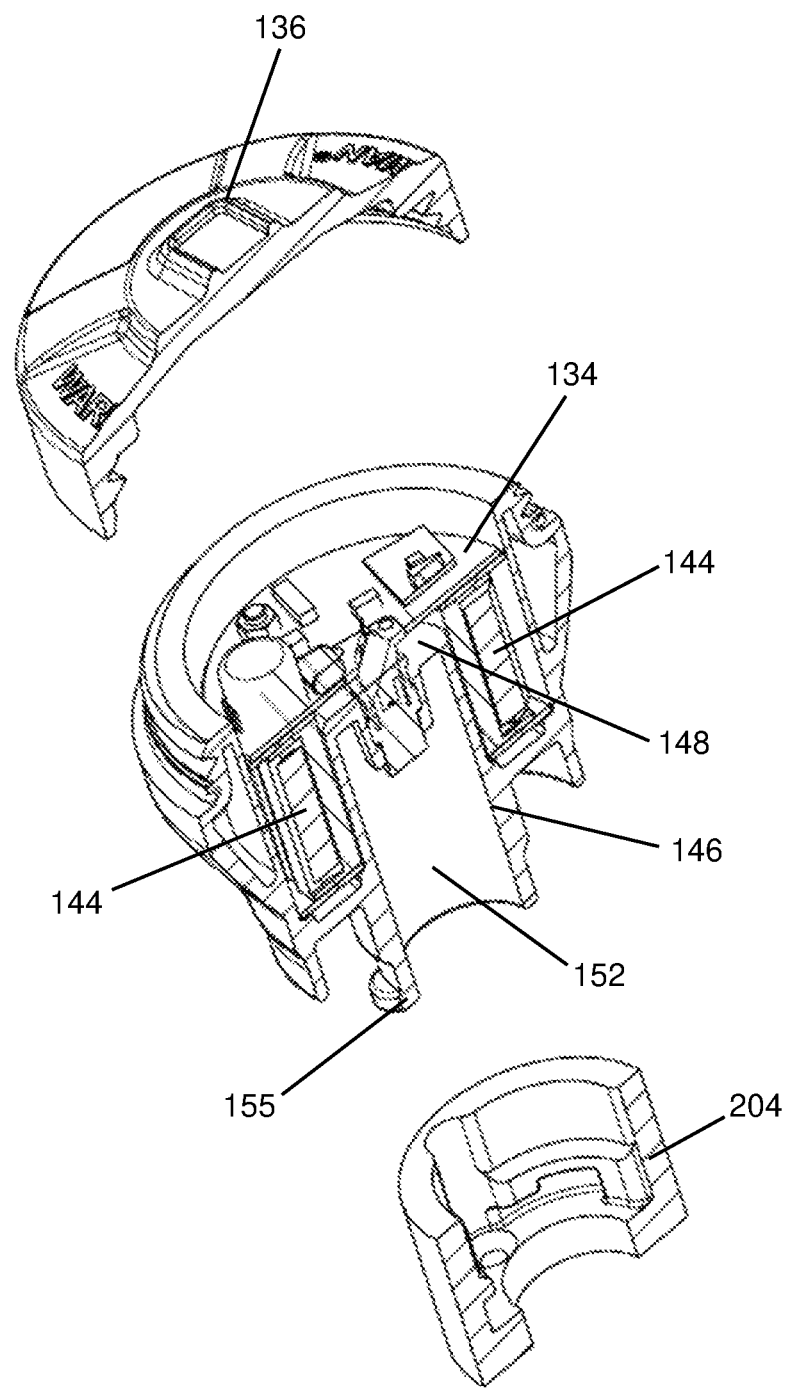
FIG. 10 illustrates a top perspective exploded section view of a sensing device in accordance with an embodiment of the present invention.

As shown in the FIGS. 9 and 10, the head portion 132 may include a cap 136, which is arranged to removably connect to a base 138. The connection between the cap 136 and the base 138 provides a watertight seal that prevents water and other contaminants like dirt, mud or oil from penetrating into the head portion 132. The cap 136 may connect to the base 138 by means of a screw connection facilitated by a mating thread provided to an outer rim of the base 138 and the inner rim of the cap 136. Alternatively, the cap 136 may connect to the base 138 by means of a snap fit connection. Such methods of connection are provided as examples to demonstrate the workings of the invention. Therefore, in light of such variations, the skilled addressee would understand that other similar means of removably connecting the cap 136 to the base 138 in a way that facilitate a water and dirt proof housing would be understood to fall within the scope of the invention as described and defined in the claims.

The base 138 may be shaped to form a recess 140, the recess 140 being arranged to receive a power source housing 142, the power source housing 142 being arrange to retain at least one power source 144. The base 138 may also include a hollow housing 146, the hollow housing 146 having a first end and a second end. The first end 148 of the hollow housing 146 protrudes upwards from the floor of the base 138, where the first end 148 of the hollow housing 146 is receivable within a recess formed in the centre of the power source housing 142. When the head portion 132 is assembled, the first end 148 is arranged to sit proximate to the at least one power source 144 and the communication module 134. This arrangement is clearly shown in FIG. 11, where the first end 148 is proximate to the at least one power source 144 and the communication module 134. Further, the first end 148 is formed with an aperture 150 that enables access to the interior 152 of the hollow housing 146. As shown, the aperture 150 may have a smaller diameter than the diameter of the interior 152 due to a circular lip 154.

The hollow housing 146 may be arranged to extend past the base 138 of the head portion 132, such that the second end 155 of the hollow housing 146 is distally located with respect to the at least one power source 144 and the communication module 134. The second end 155 of the hollow housing 146 is formed with an opening 156, the opening 156 having the same diameter as the diameter of the interior 152. That is, the opening 156 does not contain a neck or lip.

Figure 12:
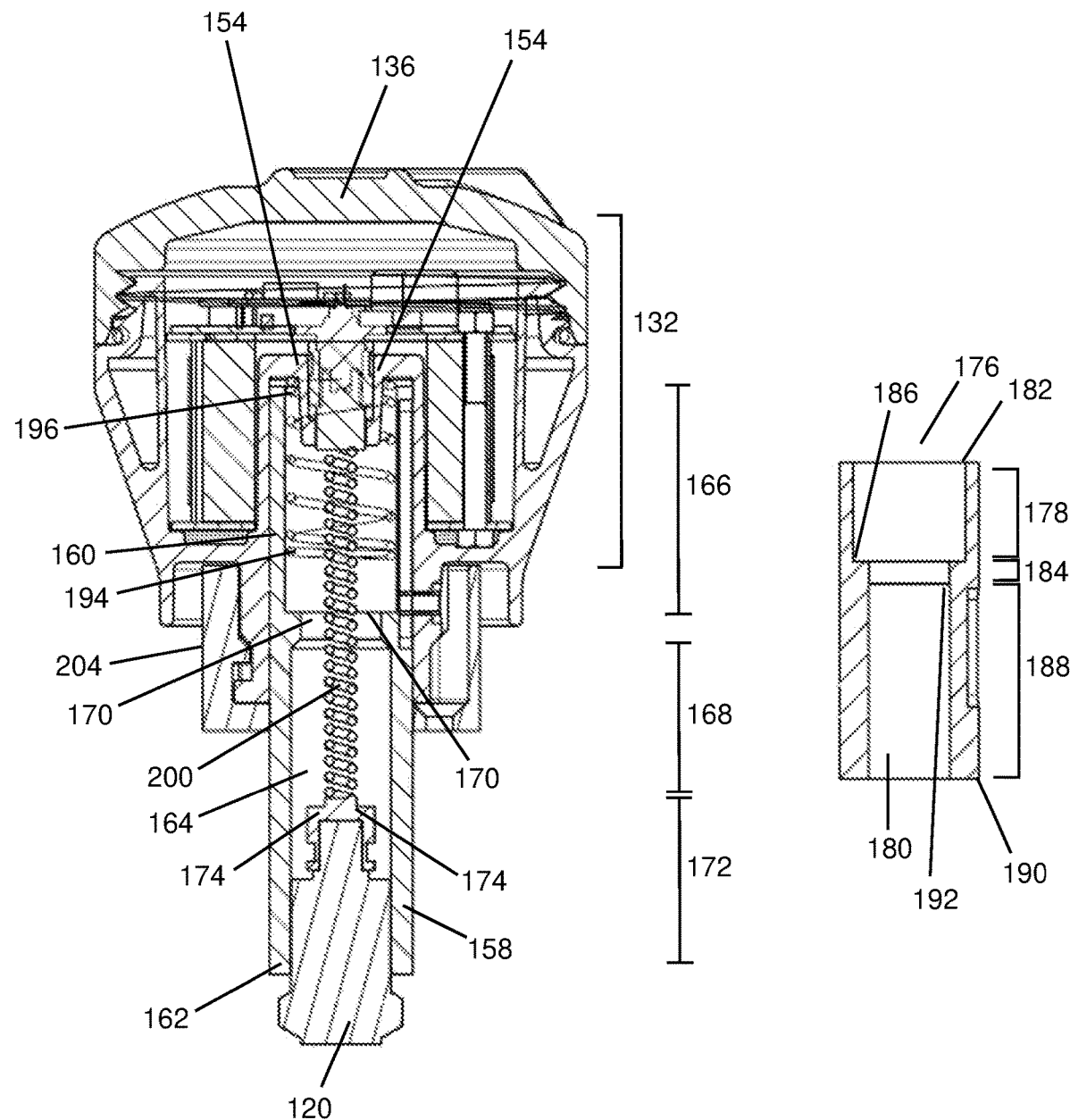
FIG. 12 illustrates a side section view of a sensing device in accordance with an embodiment of the present invention.

In an embodiment, the body portion includes an elongate tube member. The elongate tube member may be arranged to be fixed or integrally formed with the head portion 132. Alternatively, FIG. 12 provides an embodiment where the body portion 118 includes an elongate tube member 158, wherein the elongate tube member 158 is slidably received within the head portion 132. The opening 156 may be arranged to slidably receive the elongate tube member 158, which for convenience is here after referred to as the "tube member" The tube member 158 is hollow and is sized to be freely slidable within the interior 152 of the hollow housing 146. The tube member 158 includes two ends, a first end 160 arranged to be received within the opening 156 and slidable within the interior 152. The outer diameter of the tube member 158 remains constant along its length. The second end 162 of the tube member 158 is arranged to retain the sensor 120. The first end 160 of the elongate tube member 158 may include a bias mechanism that biases the elongate tube member 158 towards the main liner 108 or side liner 106 of the pump 102 relative to the head portion 132.

The tube member 158 further includes an elongate interior 164 bounded and defined by an inner diameter. In an embodiment, the inner diameter along the length of the tube member 158 may vary to define different sections of the elongate interior 164. For example, as shown in FIG. 12, the tube member 158 includes a first section 166, the first section 166 being a portion of the elongate interior 164 arranged to locate between the first end 160 and a second section 168 of the of the elongate interior 164. The inner diameter of the second section 168 is less than the diameter of the first section 166, such that the boundary of the first section 166 and the second section 168 forms a step 170.

The tube member 158 may also include a third section 172, which is arranged to locate between the second section 168 and the second end 162 of the tube member 158. The inner diameter of the second section 168 is less than the diameter of the third section 172, such that the boundary of the second section 168 and the third section 172 forms a flange 174.

In another embodiment, an alternate arrangement is provided with alternate elongate tube member 176. Alternate tube member 176 may include a first section 178, the first section 178 being a portion of the elongate interior 180 arranged to locate between the first end 182 of the alternate tube member 176 and a second section 184 of the of the elongate interior 180. The inner diameter of the second section 184 is less than the diameter of the first section 178, such that the boundary of the first section 178 and the second section 184 forms a step 186.

The alternate tube member 176 may also include a third section 188, which is arranged to locate between the second section 184 and the second end 190 of the alternate tube member 176. The inner diameter of the second section 184 is less than the diameter of the third section 188, such that the boundary of the second section 184 and the third section 188 forms a flange 192.

As can be seen from the tube member 158 and the alternate tube member 176, the tube members may include different variations and permutations of arrangements, sizes, diameters and lengths may be used to suit different types of pumps and for use in measuring different liners for pumps. For example, tube member 158 may be used with a front side liner 106 and alternate tube member 176 may be used with a main liner 108. Further variations in the tube member 158 may also be present to incorporate whether the liner is axially adjustable within the pump 102.

In an embedment, the first end of the tube member 158 includes a bias mechanism that biases the tube member 158 towards the main liner 108 or side liner 106 of the pump 102 relative to the head portion. For example, the tube member 158 includes a spring 194. A first end 196 of the spring 194 abuts the lip 154 formed by the first end 148 of the hollow housing 146. A second end 198 of the spring 194 abuts the step 170 formed at the boundary of the first and second portions 166, 168, and when so arranged, the spring 194 is in a state of compression. The sensor 120 is at least partially housed within the third section 172 at the second end 162 of the tube member 158. As such, the bias mechanism, in this case the spring 194 whilst in a state of compression, biases the sensor 120 to be in contact with the liner of the pump 102. This in turn enables the sensor 120 to more accurately measure the thickness of the liner of the pump 102 as the sensor 120 constantly remains in contact with the liner due to the force of the bias.

Further, in an embodiment where the liner is a front side liner 106 and is axially adjustable, the bias mechanism enables the sensor 120 to remain in contact with the front side liner 106 whilst the user is axially adjusting the front side liner 106 with respect to the main liner 108. This in turn enables the sensor 120 to more accurately measure the thickness of the front side liner 106 of the pump 102 as the sensor 120 is always in contact with the front side liner 106 regardless of the front side liner's axial position within the pump 102. This is clearly shown in FIG. 1, where the front side liner 106 has moved away from outer casing 104 and this movement has caused a gap to form between these components, where the gap is breached by the expansion of the compressed spring 194 which biases the sensor 120 to be in contact with the front side liner 106.

Figure 11:
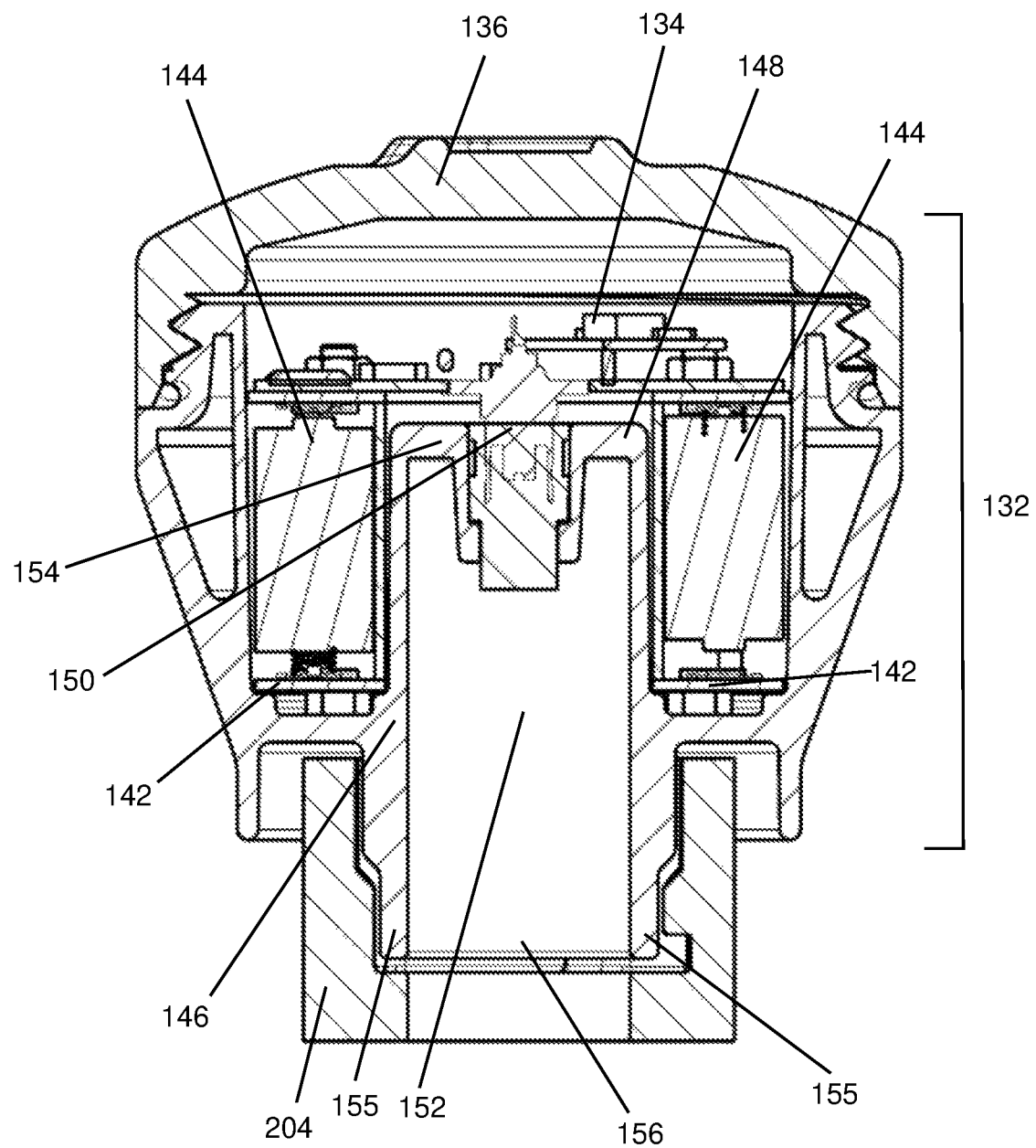
FIG. 11 illustrates a side section view of a sensing device in accordance with an embodiment of the present invention.

In an embodiment, the head portion 132 may further comprise at least one power source 144. For example, as shown in FIG. 11, the head portion 132 includes two power sources 144 that are provided on opposing sides within the head portion 132. Such power sources may include, but are not limited to, Lithium batteries, for example CR123A 3 Volt Lithium batteries. Alternatively, as shown in FIG. 9, a symmetrical arrangement of four batteries is provided, although only three of these batteries are viewable. Further, another embodiment is provided where the head portion 132 houses eight batteries. Therefore, it would be understood by the skilled addressee that other arrangements, numbers of batteries and types of batteries and power sources would be understood to be within the scope of the invention as described and defined in the claims.

In an embodiment, the at least one power source 144 is connected to the communication module 134 and powers the operation of the sensor 120. In other words, the at least one power source is arranged to provide power to the sensor 120 via the communication module 134. The communication module 134 may include various circuitry components to transform the voltage from the power source to the voltage required by the sensor to transmit an ultrasonic pulse. For example, the communication module may include a DC to DC step up converter or transformer to convert 3 Volts from the power source to 400 Volts as required by the sensor 120.

As such, the connection between the communication module 134 and the sensor 120 is arranged to enable the relative movement between the sensor 120 and tube member 158 relative to the rest of the head portion 132. For example, the sensing device 100 includes a wired connection 200 that joins the communication module 134 to the sensor 120. The wired connection 200 is arranged to enable the relative movement of the sensor 120 and tube member 158 relative to the head portion 132. In an embodiment, the wired connection 200 is an expandable and contractible coil of insulated wire, capable transmitting electrical and data signals between the sensor 120 and the communication module 134. The wired connection 200 may be arranged to pass through the opening 156 and along the elongate interior 164. The wired connection 200 may be formed in a helical coil along at least part or all of its length.

Figure 13:
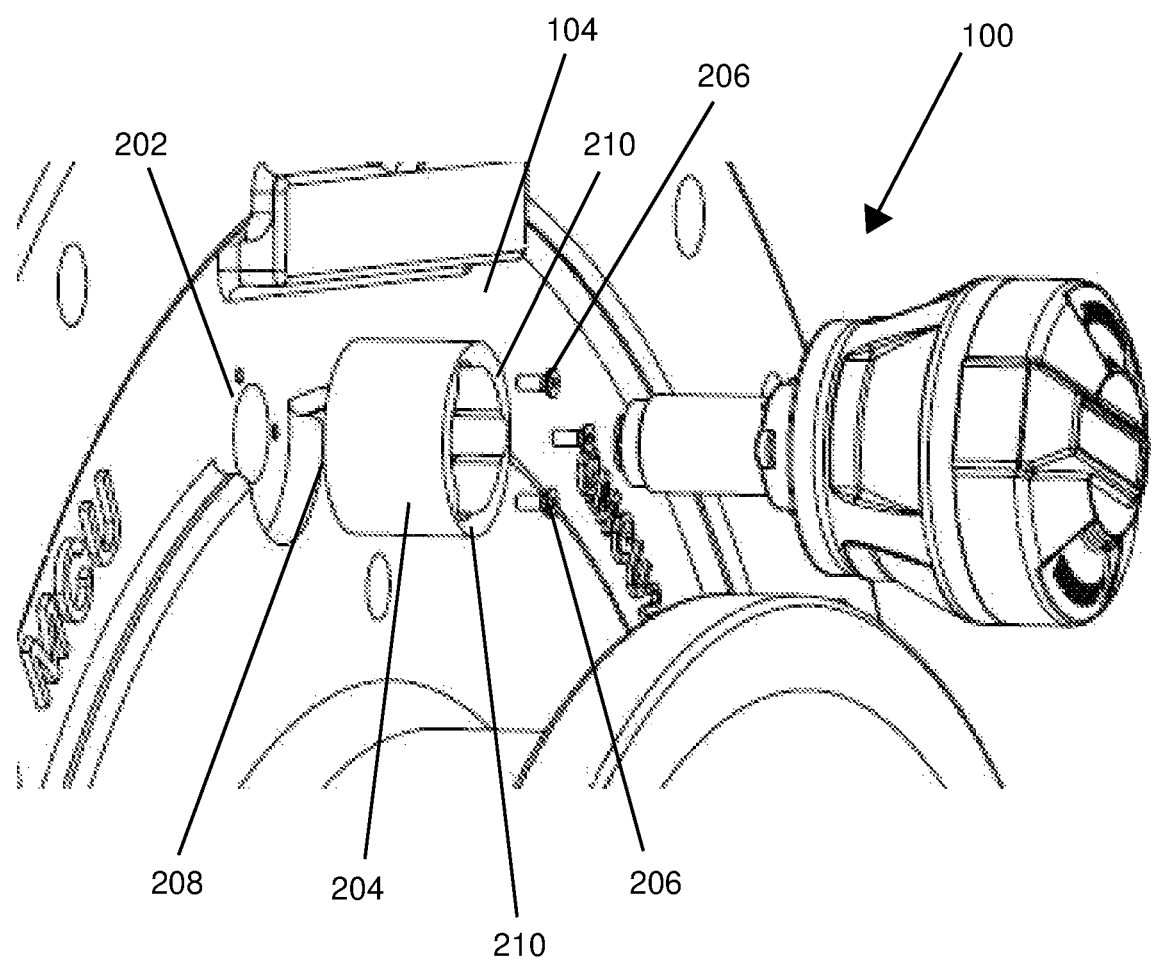
FIG. 13 illustrates a perspective exploded view of a sensing device in accordance with an embodiment of the present invention.
Figure 14:
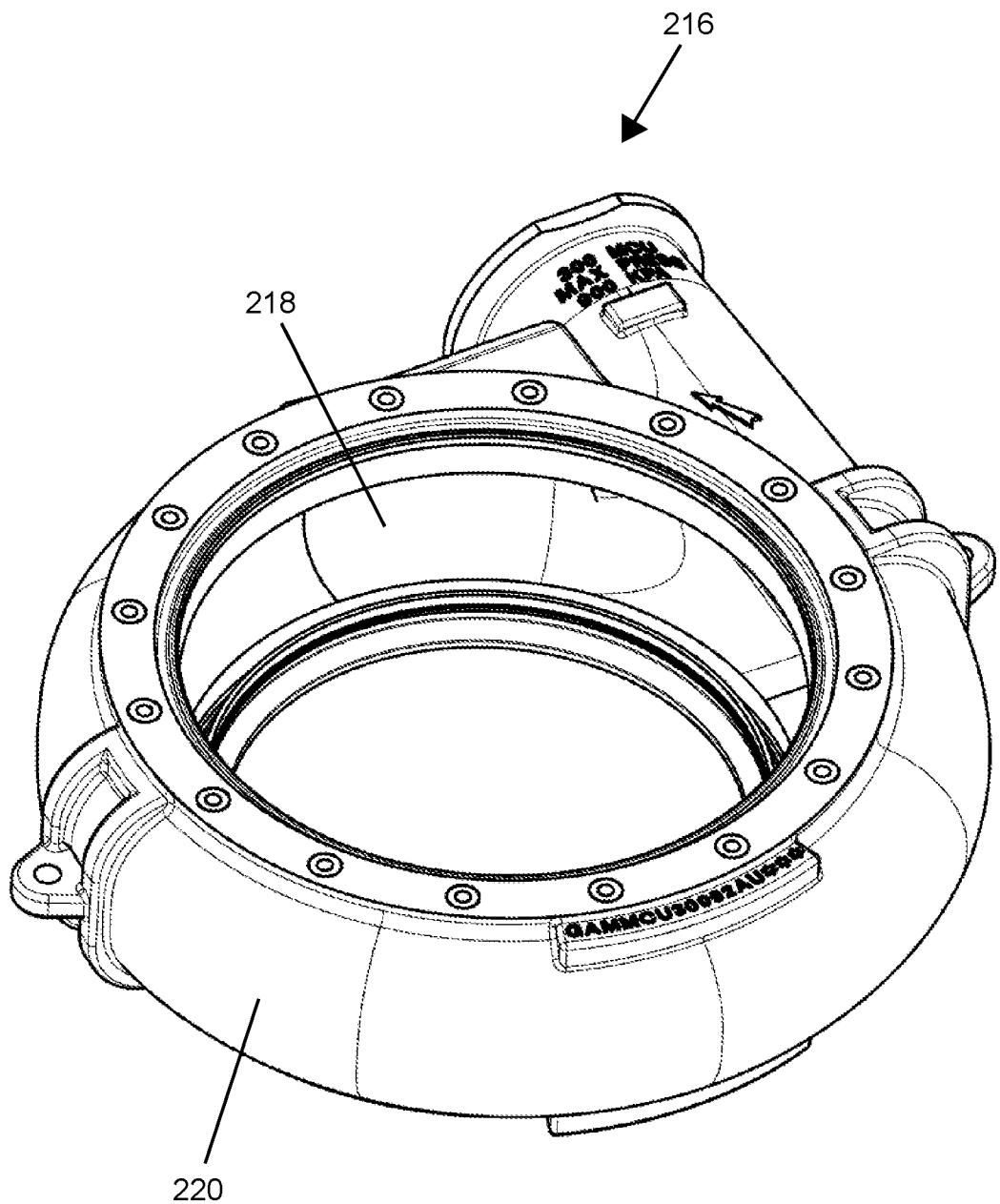
FIG. 14 illustrates a bottom perspective view of an example outer casing of an unlined pump in accordance with an alternate embodiment of the present invention.
Figure 15:
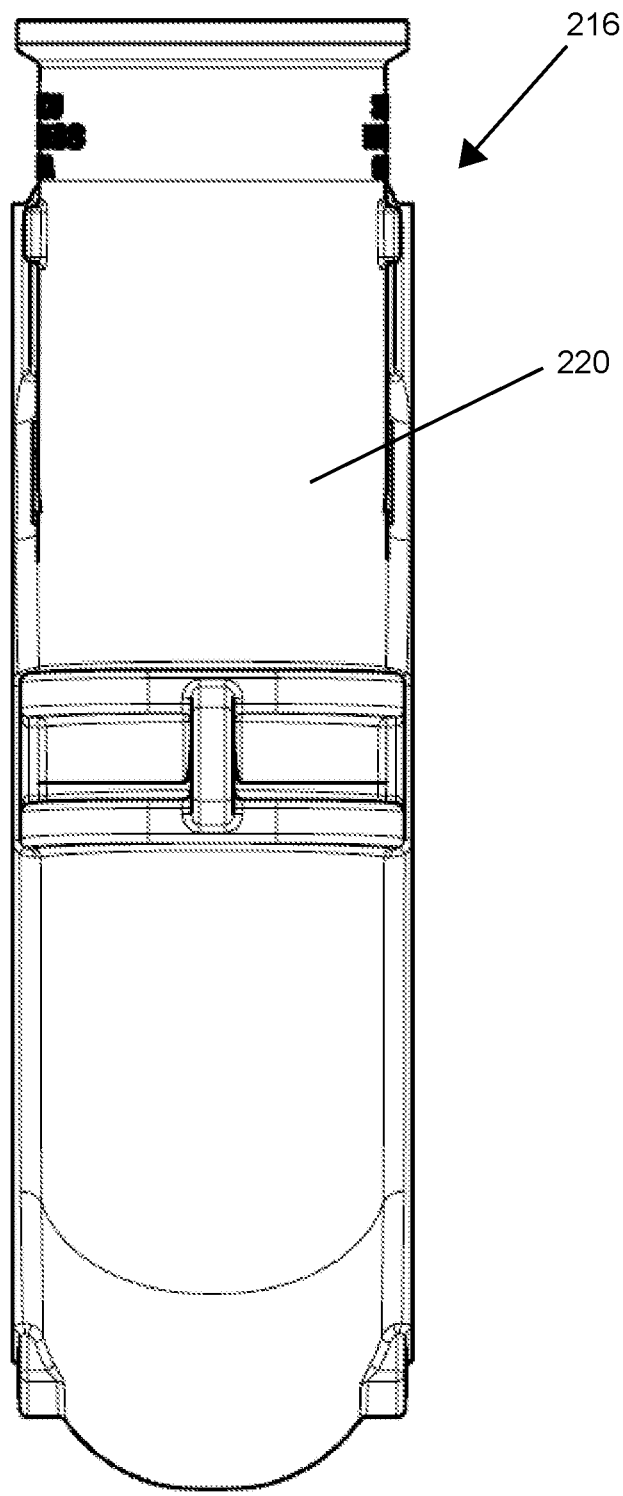
FIG. 15 illustrates a right side view of an example outer casing of an unlined pump in accordance with an alternate embodiment of the present invention.

Referring now to FIGS. 11 and 13, an embodiment is provided wherein the body portion 118 and/or head portion 132 includes a connection portion 204 that is arranged to be connected to the outer casing 104. The body portion 118 and/or head portion 132 may be removably connected to the connection portion 204 which holds the body portion and/or head portion to enable the sensing device 100 to pass through the outer casing 104 of the pump 102. An aperture 202 may be formed to extend through the outer casing 104. The connector portion 204 may be fastened to the outer casing 104 by means of screws 206 or similar fastening devices that enable a robust and tight connection. The connector portion 204 may be arranged such that an aperture 208 formed in the connection portion 204 aligns with the aperture 202 formed in the outer casing 104.

The body portion 118 may be received and retained within the apertures 202 and 208. The body portion 118 and the connection portion 204 may each include respective connective cammed surfaces that engage with one another to removably connect the body portion 118 to the connection portion 204. For example, as shown in FIGS. 11 and 13, the connection portion 204 and the body portion 118 may connect together using a bayonet connection 210. However, the skilled addressee would understand that other similar mechanical means of removably and securely attaching the body portion 118 and/or head portion 132 to the connection portion 204 may be available, and hence connecting the sensing device 100 to the pump 102.

Referring to FIGS. 14 to 18, an alternate embodiment is provided for sensing device 100 for use with an unlined pump 212. An unlined pump 212 is one that does not include separate liners that experience wear. Instead, the inner surface 218 of the outer casing 216 of the unlined pump 212 experiences wear during the pumping process. The outer casing 216 may be formed from the same wear resistant material as the liners as described above. The unlined centrifugal slurry pump 212 includes an impeller that rotates about an axis. Further, referring to FIGS. 14 and 15, the unlined centrifugal slurry pump 212 includes an outer casing 216, the outer casing 216 including an inner surface 218 and an outer surface 220.

In an embodiment, a sensing device 100 for an unlined centrifugal slurry pump 212 is provided. The sensing device 100 may comprise a body portion 118 arranged to engage with a bracket 214 connected to the outer surface 220, wherein the body portion 118 includes a sensor 120 in contact or biased towards contact with the outer surface 220 of the unlined centrifugal slurry pump 212.

In such an embodiment, the sensing device 100 may be alternatively provided so that the sensor 120 senses a distance between the outer surface 220 of the outer casing 216 and an inner surface 218 of the outer casing 216 to provide at least one thickness reading for the outer casing 216. That is, the sensor 120 may be arranged to transmit an ultrasonic pulse from the outer surface 220 of the outer casing 216 and measure the time interval until the pulse reflected of the interface formed by the inner surface 218 of the outer casing 216.

Figure 16:
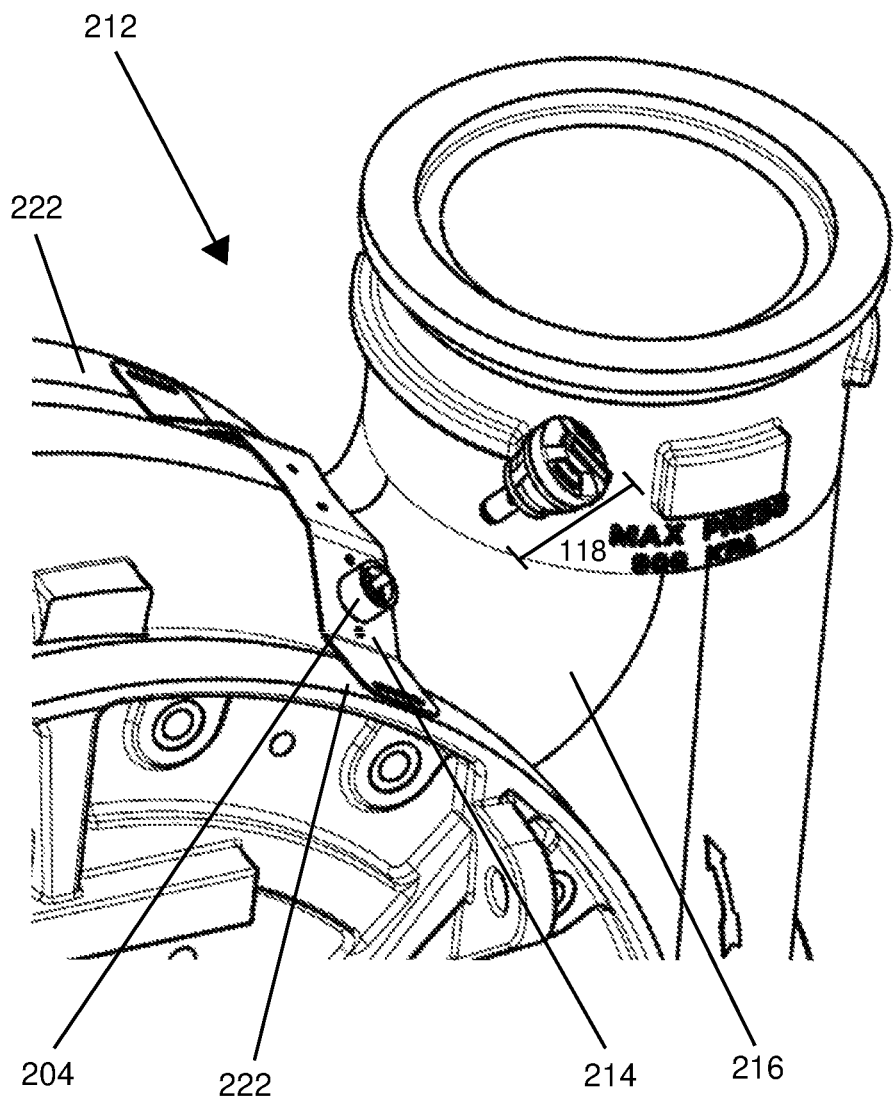
FIG. 16 illustrates an exploded perspective view of an example of a sensing device in accordance with an embodiment of the present invention.

In an embodiment, the sensing device 100 may be connected to the outer casing 216 of the unlined centrifugal slurry pump 212 via an elongate bracket 214. In one embodiment, the connection portion 204 of the body 118 may be connected to the bracket 214 in a similar manner to how the connection portion 204 connects to the outer casing 202 of the lined pump 102 embodiments. In turn, the ends of the bracket 214 are connected to a non-wearing face 222 the outer casing 216 of the unlined pump 212. As shown in FIG. 16, the bracket 214 is arranged to extend around or over a portion of the outer casing 216 and connect to the non-wearing face 222 provided on either side of the unlined pump 212. In an example, the bracket may include a metal plate that includes an aperture that is configured to receive and engage with the connection portion 204, by means of mechanical fasteners, snap fit arrangements, or cammed surfaces.

Connection of the sensing device 100 to the unlined pump 212 by means of the bracket 214 removes the requirement to drill into the outer casing 216. Drilling into the casing of an unlined pump 212 is difficult and expensive due of the wear resistant material used for the outer casing 216. Further, drilling into the outer casing 216 will also compromise the strength and thickness of the wearing part, which may lead to premature failure of the unlined pump 212, where such failure may be catastrophic.

Figure 17:
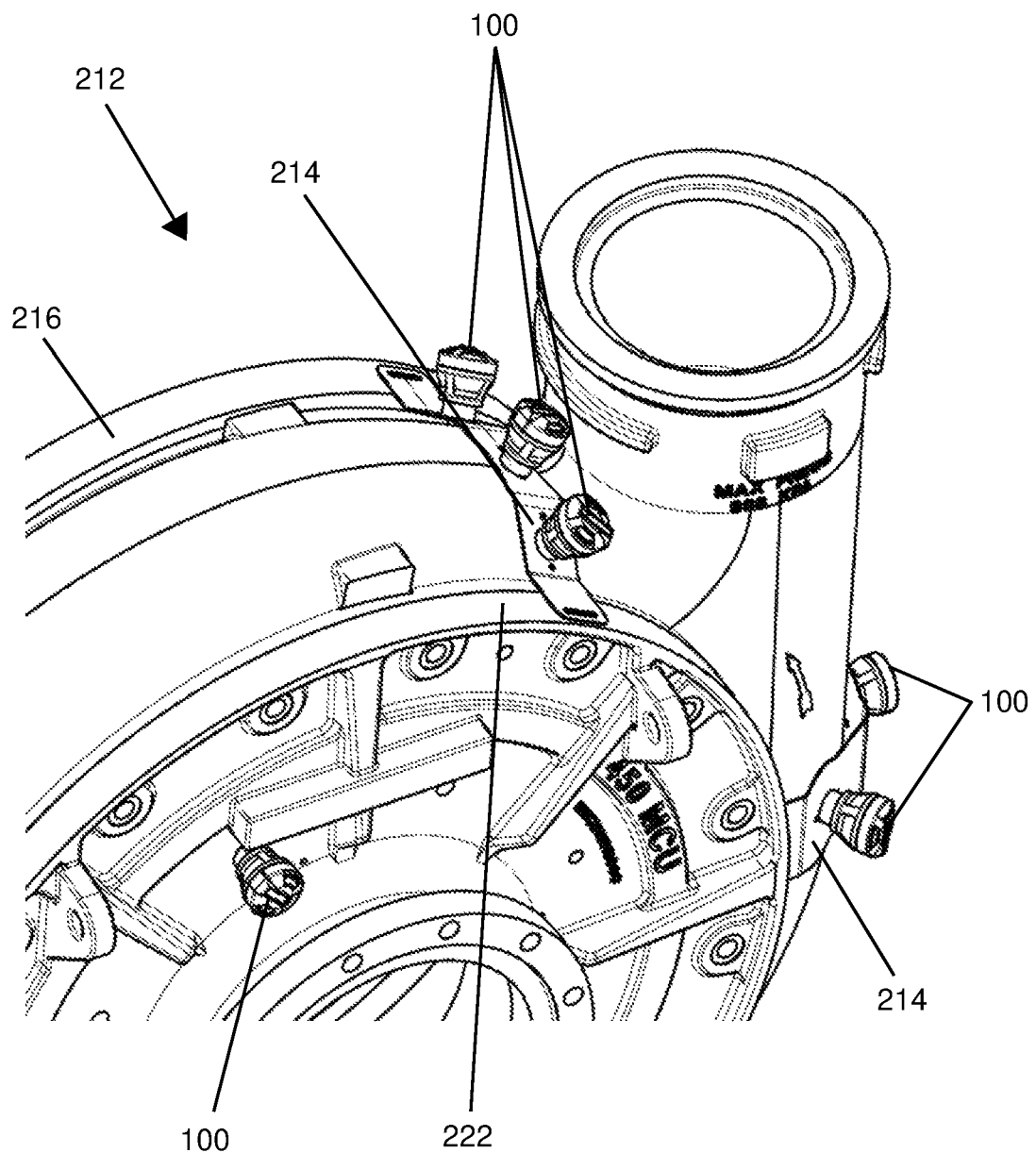
FIG. 17 illustrates a perspective view of an example of a sensing device in accordance with an embodiment of the present invention.

Referring to FIG. 17, a number of alternate embodiments are provided. In an embodiment, at least one sensing device 100 is connected to an unlined pump 212. In the example shown, the at least one sensing device 100 includes six sensing devices 100. The sensing devices 100 may be arranged in various arrangements in order to measure the thickness of the outer casing 216 of the unlined pump 212. The arrangement and relative positions of the sensing devices 100 shown are merely provided as an example, as a person skilled in the art would understand that such locations are non-limiting. Further, the skilled addressee would also understand that an arrangement of multiple sensing devices 100 may also be used to measure the thickness of various liners or various sections of a lined in a pump 102.

In an embodiment, five of the six sensing devices 100 are connected to the bracket 214 and one of the sensing devices 100 being connected directly to the non-wearing face 222. As such, an embodiment is provided wherein the non-wearing face 222 may be configured to receive and engage with the connection portion 204, by means of mechanical fasteners, snap fit arrangements, or cammed surfaces.

In an embodiment, the sensing device 100 may be provided in a generally cylindrical shape. As such, the head portion 132 and the tube member 156 may be cylindrically shaped. That is, they have an approximate cross sectional shape of a circle along a first axis and are elongate along another perpendicular axis. However, as would be understood by the skilled addressee, other shapes may be contemplated to accommodate different sizes or shaped sensors 120, positions of the liner or variations in the pumps. Therefore, the person skilled in the art would understand that variations in the size and general shape of the sensing device 100 is within the scope of the invention as described and defined in the claims.

Figure 18:
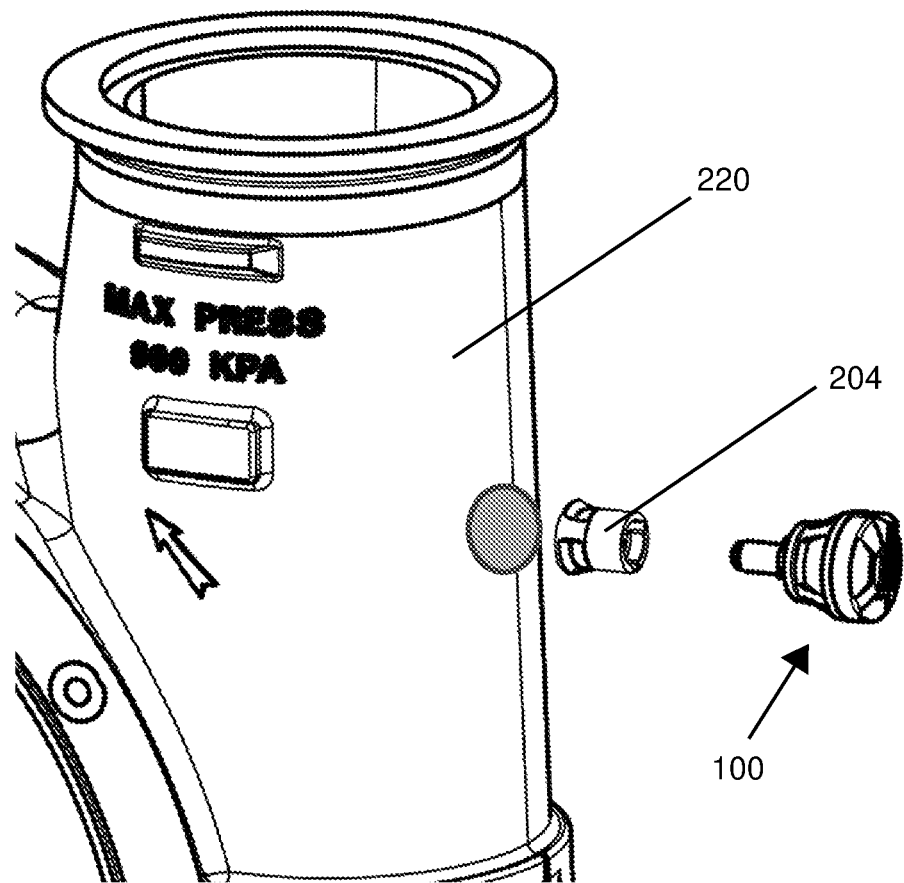
FIG. 18 illustrates a part view of a perspective view of a sensing device in accordance with an embodiment of the present invention.

FIG. 18 depicts a further embodiment where the sensing device may be coupled to a connecting portion 204 which itself may be adhered to the non-wearing face of the outer surface 222 of the unlined pump casing.

With reference to FIGS. 1 to 13, there is provided an embodiment for a system for detecting wear in a centrifugal slurry pump 102. The pump 102 includes a side liner 106 and a main liner 108 housed within an outer casing 104. The system comprises at least one sensing device 100 arranged to pass through the outer casing 104, wherein the at least one sensing device 100 includes a sensor 120 biased towards contact with either the side liner 106 or the main liner 108 of the pump 102. The at least one sensing device 100 may be arranged to detect a first thickness reading and a second thickness reading using the sensor 120. The first thickness reading and the second thickness reading may be in respect of the side liner 106 or the main liner 108 of the pump.

In an embodiment, the system may further include a computing device that is arranged in communication with the at least one sensing device 100. The computing device may be arranged to receive the first thickness reading and the second thickness reading from the at least one sensing device 100. The computing device may then use the first thickness reading and the second thickness reading to determine a change in thickness of the side liner 106 or the main liner 108 due to wear incurred during the operation of the pump 102.

In an embodiment, the side liner 106 is a front side liner that is arranged to be axially adjustable with respect to the main liner 108. Upon determining the change in the thickness of the front side liner 106, a user axially adjusts the front side liner 106 relative to the main liner 108 in accordance with the change in thickness of the front side liner 106. This enables the optimum distance between the front side liner 106 and the impeller to be maintained.

Again, with reference to FIGS. 1 to 13, there is provided an embodiment for a method of detecting wear in in a centrifugal slurry pump. The centrifugal slurry pump including a side liner 106 and a main liner 108 housed within an outer casing 104 of the pump 102. The method comprising the steps of firstly arranging at least one sensing device 100 to pass through a surface of the outer casing 104. The at least one sensing device 100 includes a sensor 120 capable of detecting the thickness of the either the side liner 106 or the main liner 108. Further, the at least one sensing device 100 is arranged such that the sensor 120 is biased towards contact with either the side liner 106 or the main liner 108.

The method further includes the step of communicating a first thickness reading and a second thickness reading of either the side liner or the main liner from the at least one sensing device 100 to a computing device. Once the first and second thickness readings have been communicated to the computing device, the computing device determines a change in thickness of the side liner due to wear using the pump 102.

The sensing device referred to herein may be made of any material suitable for being shaped, formed or fitted as described, such as a plastic material. The plastic material may have properties such as high mechanical strength and impact resistance, High Glass Transition Temperature (Tg), UV resistance, water resistance, high dimensional stability and good chemical resistance. For example, the body portion 118 may be made from a thermoplastic such as Acrylonitrile styrene acrylate (ASA) or other similar composite materials. The spring 194 may be made from a metallic material or alloy that enables effective storage of mechanical energy. For example, the sprint 198 may be made of stainless steel.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "above" and "below" and the like are used as words of convenience to provide reference points and are not to be construed as limiting terms.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that modifications, changes, substitutions or alterations will be apparent to those skilled in the art without departing from the scope of the present invention.

Throughout this specification and the claims which follow, unless the context requires otherwise, the word "comprise", and variations such as "comprised", "comprises" or "comprising", will be understood to imply the inclusion of a stated integer or step or group of integers or steps but not the exclusion of any other integer or step or group of integers or steps.

As used herein, a, an, the, at least one, and one or more are used interchangeably, and refer to one or to more than one (i.e. at least one) of the grammatical object. By way of example, "an element" means one element, at least one element, or one or more elements.

In the context of this specification, the term "about" is understood to refer to a range of numbers that a person of skill in the art would consider equivalent to the recited value in the context of achieving the same function or result.

Advantages

The embodiments described herein provide a novel means of enabling a user to determine the thickness of a liner within a pump at various points along that liner. Further, the embodiments described enable a user to determine the thickness of a liner with improved accuracy over any current techniques. In particular the arrangement of the sensor biased towards the main liner, side liner and/or casing provides that there is little to no air gap provided between the sensor and the main liner, side liner and/or casing which increases the accuracy of the readings.

The device, system and methods described herein provide the user with information that allows them to identify the optimal time to replace or repair the liners. Replacing or repairing the liners at the optimal time avoids the financially cost of replacing the liners too early. Moreover, replacing or repairing the liners before they suffer too much wear also reduces the risk of failure of the liner and damage to the impeller, casing and other components. Essentially, the embodiments described provide accurate and relevant information to operators and users to remove the "guess work" about undertaking optimised maintenance of the pumps. Further, this information is obtained without having to open the pump and visually inspect the liners, which is a time consuming and costly process.

Further, these embodiments enable the thickness of an axially adjustable front side liner to be determined, for which there are no current solutions that are able to accommodate this axial adjustment when determining the thickness of the front side liner.

Moreover, the embodiments describe a sensing device that is able be retrofitted to existing pumps without compromising the integrity of the outer casing when operating under high-pressure conditions.

Further, the embodiments described enable the wireless communication of information relating to that thickness to a user in a quick effective manner. Moreover, the interchangeability of the parts enables easy and cost effective replacement of the sensing devices and easy and cost effective modification of the sensing devices to suit different pumps.

Further, the sensing device described may be able to run various types of software that will enable the sensing device to communicate with any "smart" device with the appropriate software installed, as described above. As such, the wide scale application of this device, system and method would not be limited to communicating data to any particular device or platform.

In a further advantageous aspect, the embodiments described provide a device that, once installed initially, the sensing device may be removed and attached easily and without tools. Moreover, the easily to remove design of the sensing device improves the serviceability and maintainability of the pump.

Moreover, once sufficient thickness readings and such data has been collected from the sensing device, the above mentioned further analysis of the date by the computing device may include forecasting when a pump requires service with much greater accuracy than the current available methods.

The invention claimed is:

1. A sensing device for a centrifugal slurry pump having an impeller which rotates about an axis, the centrifugal slurry pump including a front side liner and a main liner housed within an outer casing of the pump, the front side liner comprising a front face and a rear face, the front face arranged to face the impeller housed within the main liner, and the rear face arranged to face the outer casing the sensing device comprising:
a body portion arranged to pass through the outer casing, wherein the body portion includes a sensor in contact with the front side liner, wherein the sensor is biased towards contact with the front side liner, the front side liner arranged to be axially adjustable with respect to the main liner, and the sensor arranged to remain biased towards and in contact with the front side liner when the front side liner is axially adjusted with respect to the main liner of the pump.

2. The sensing device in accordance with claim 1, wherein the sensor senses a distance between the front face and the rear face to provide at least one thickness reading for the front side liner.

3. The sensing device in accordance with claim 2, wherein the at least one thickness reading includes a first thickness reading and a second thickness reading, where the first thickness reading and the second thickness reading are separated by a period of use of the pump.

4. The sensing device in accordance with claim 3, wherein the body portion includes a head portion, said head portion including a communication module in connection with the sensor.

5. The sensing device in accordance with claim 4, wherein the head portion is arranged to be located outside an outer surface of the outer casing.

6. The sensing device in accordance with claim 4, wherein the communication module transmits each of the first thickness reading and the second thickness reading from the sensor to a computing device.

7. The sensing device in accordance with claim 6, wherein the computing device compares the first thickness reading and the second thickness reading to determine a change in thickness of the front side liner for the period of use.

8. The sensing device in accordance with claim 7, wherein the computing device signals the axial adjustment of a position of the front side liner relative to the main liner in accordance with the change in thickness of the front side liner such that the distance between the front side liner and an impeller housed in the main liner remains constant.

9. The sensing device in accordance with claim 4, wherein the body portion includes an elongate tube member, wherein the elongate tube member is slidingly received within the head portion.

10. The sensing device in accordance with claim 9, wherein a first end of the elongate tube member includes a bias mechanism that biases the elongate tube member towards the front side liner of the pump.

11. The sensing device in accordance with claim 10, wherein the bias mechanism is a spring.

12. The sensing device in accordance with claim 10, wherein a second end of the elongate tube member portion includes the sensor.

13. The sensing device in accordance with claim 10, wherein the body portion is cylindrically shaped.

14. The sensing device in accordance with claim 10, wherein the head portion further comprises at least one power source.

15. The sensing device in accordance with claim 14, wherein the at least one power source is connected to the communication module and powers the operation of the sensor.

16. The sensing device in accordance with claim 15, wherein the sensing device includes a wired connection that joins the communication module to an ultrasonic device.

17. The sensing device in accordance with claim 16, wherein the wired connection is an expandable and contractible coil of insulated wire.

18. The sensing device in accordance with claim 16, wherein the wired connection is arranged to enable the relative movement of the elongate tube member relative to the head portion.

19. The sensing device in accordance with claim 14, wherein the at least one power source is a Lithium battery.

20. The sensing device in accordance with claim 1, wherein the body portion includes a connection portion that is arranged to be connected to the outer casing.

21. The sensing device in accordance with claim 20, wherein the body portion is removably connected to the connection portion such that the sensing device passes through the outer casing of the pump.

22. The sensing device in accordance with claim 1, wherein the sensor is an ultrasonic sensor.

23. The sensing device in accordance with claim 22, wherein the ultrasonic sensor is an ultrasonic transducer.

24. The sensing device in accordance with claim 23, wherein the ultrasonic transducer is a piezoelectric transducer.

25. A system for detecting wear in a centrifugal slurry pump with a front side liner and a main liner housed within an outer casing, wherein the front side liner is arranged to be axially adjustable with respect to the main liner, said system comprising: at least one sensing device arranged to pass through the outer casing, wherein the at least one sensing device includes a sensor biased towards contact with the front side liner and which is arranged to remain biased towards and in contact with the front side liner when the front side liner is axially adjusted with respect to the main liner.

26. The system in accordance with claim 25, wherein the sensor detects a first thickness reading and a second thickness reading of the front side liner.

27. The system in accordance with claim 26, wherein the system further includes a computing device in communication with the at least one sensing device, the computing device being arranged to receive the first thickness reading and the second thickness reading from the at least one sensing device to determine a change in thickness of the side liner or the main liner.

28. The sensing device in accordance with claim 25, wherein the computing device uses the first thickness and the second thickness reading to determine a change in thickness of the front side liner.

29. The system in accordance with claim 28, wherein a user axially adjusts the front side liner relative to the main liner in accordance with the change in thickness of the front side liner.

30. A method of detecting wear in a centrifugal slurry pump with a front side liner and a main liner housed within an outer casing, wherein the front side liner is arranged to be axially adjustable with respect to the main liner, the method comprising the steps of:
- arranging at least one sensing device to pass through a surface of the outer casing, the at least one sensing device including a sensor;
- arranging the at least one sensing device relative to the pump such that the sensor is biased towards and in contact with the front side liner;
- communicating a first thickness reading and a second thickness reading of the front side liner from the at least one sensing device to a computing device;
- determining a change in thickness of the front side liner due to wear using the computing device; and
- axially adjusting the front side liner relative to the main liner in accordance with the change in thickness of the front side liner.

\* \* \* \* \*